(12) United States Patent
Griffin

(10) Patent No.: US 10,628,037 B2
(45) Date of Patent: Apr. 21, 2020

(54) MOBILE DEVICE SYSTEMS AND METHODS

(71) Applicant: Griffin Innovation, Kitchener (CA)

(72) Inventor: Jason Griffin, Kitchener (CA)

(73) Assignee: Griffin Innovation, Kitchener (CA)

( * ) Notice: Subject to any disclaimer, the term of this patent is extended or adjusted under 35 U.S.C. 154(b) by 166 days.

(21) Appl. No.: 15/519,408

(22) PCT Filed: Oct. 8, 2015

(86) PCT No.: PCT/CA2015/051021
§ 371 (c)(1),
(2) Date: Apr. 14, 2017

(87) PCT Pub. No.: WO2016/058092
PCT Pub. Date: Apr. 21, 2016

(65) Prior Publication Data
US 2017/0235484 A1   Aug. 17, 2017

Related U.S. Application Data

(60) Provisional application No. 62/064,585, filed on Oct. 16, 2014, provisional application No. 62/084,251, (Continued)

(51) Int. Cl.
*G06F 3/0488* (2013.01)
*H04M 1/02* (2006.01)
(Continued)

(52) U.S. Cl.
CPC ........ *G06F 3/04886* (2013.01); *G06F 1/1615* (2013.01); *G06F 1/1626* (2013.01);
(Continued)

(58) Field of Classification Search
CPC .............................. G06F 3/0488; G06F 1/1626
(Continued)

(56) References Cited

U.S. PATENT DOCUMENTS 8,195,243 B2 * 6/2012 Kim ...................... G06F 1/1616
345/156
9,804,635 B2 * 10/2017 Kim ...................... G06F 3/0488
(Continued)

FOREIGN PATENT DOCUMENTS

CA       2768512        8/2012

OTHER PUBLICATIONS

International Search Report and Written Opinion of the International Searching Authority (11 pages) dated Jan. 6, 2016.

*Primary Examiner* — Cao H Nguyen
(74) *Attorney, Agent, or Firm* — Harter Secrest & Emery LLP

(57) ABSTRACT

Provided is a mobile device including a first body portion containing operational components of the mobile device, a second body portion coupled to the first body portion on a rear surface, containing auxiliary operational components of the mobile device, and a coupling hinge coupling the first body portion to the second body portion and for providing movement of the second body portion from a first position to a second position. The first body portion has a display surface and the rear surface opposite the display surface. The rear surface has a cavity. In the first position, the second body portion is recessed within the cavity of the first body portion. In the second position, the second body portion is positioned on the rear surface of the first body portion and the cavity is at least partially open to form a grip area.

15 Claims, 27 Drawing Sheets

Related U.S. Application Data filed on Nov. 25, 2014, provisional application No. 62/094,105, filed on Dec. 19, 2014.

(51) Int. Cl.

| | |
|---|---|
| *G06F 1/16* | (2006.01) |
| *H04W 88/02* | (2009.01) |
| *G06F 3/0481* | (2013.01) |
| *G06F 3/041* | (2006.01) |
| *G06F 3/0482* | (2013.01) |
| *H04M 1/23* | (2006.01) |

(52) U.S. Cl.
CPC .......... *G06F 1/1643* (2013.01); *G06F 1/1681* (2013.01); *G06F 3/041* (2013.01); *G06F 3/0482* (2013.01); *G06F 3/0488* (2013.01); *G06F 3/04817* (2013.01); *G06F 3/04883* (2013.01); *H04M 1/0214* (2013.01); *H04W 88/02* (2013.01); *H04M 1/23* (2013.01); *H04M 2250/70* (2013.01)

(58) Field of Classification Search
USPC .................................................. 715/762–765
See application file for complete search history.

(56) References Cited

U.S. PATENT DOCUMENTS

| | | |
|---|---|---|
| 2008/0058010 A1 | 3/2008 | Lee |
| 2009/0295731 A1* | 12/2009 | Kim ...................... G06F 1/1616 345/168 |
| 2011/0001715 A1* | 1/2011 | Cha ..................... H04M 1/0247 345/173 |
| 2011/0128229 A1* | 6/2011 | Lee ....................... G06F 1/1616 345/168 |
| 2011/0192857 A1 | 8/2011 | Rothbaum et al. |
| 2017/0212607 A1* | 7/2017 | Yoon ...................... G06F 3/0346 |
| 2018/0059717 A1* | 3/2018 | Kim ....................... G06F 3/0488 |

* cited by examiner

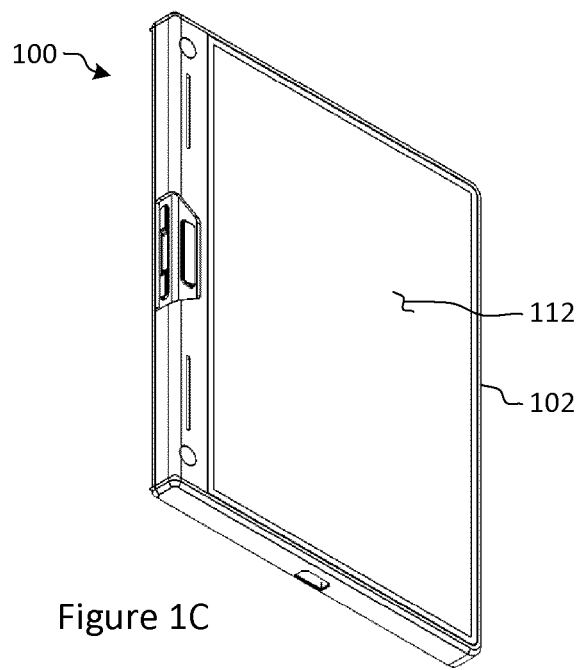
Figure 1C
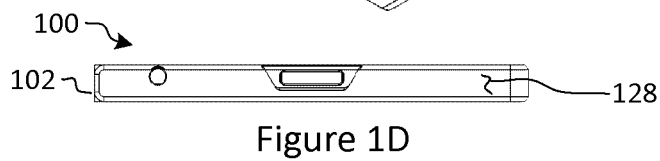
Figure 1D
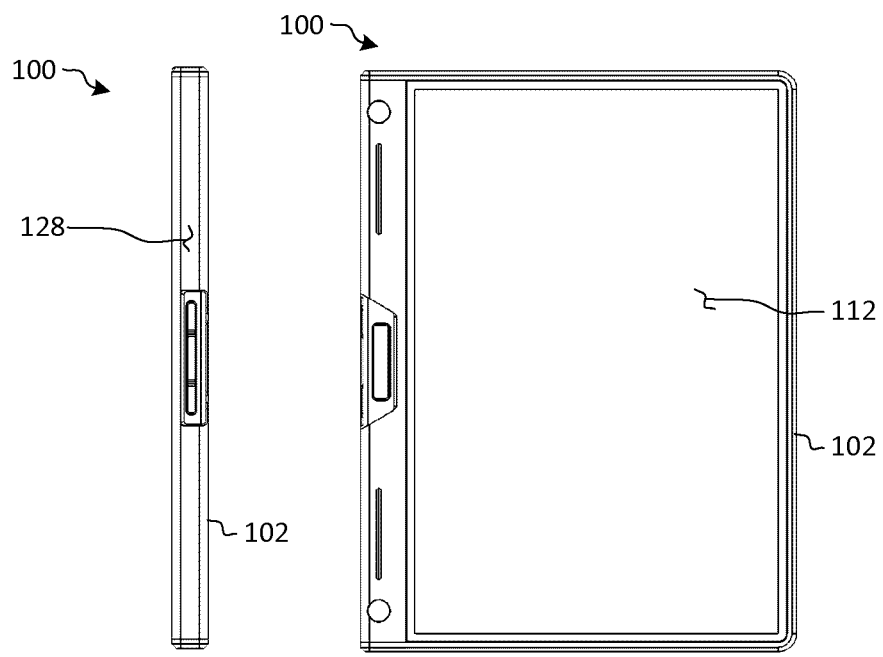
Figure 1E
Figure 1F
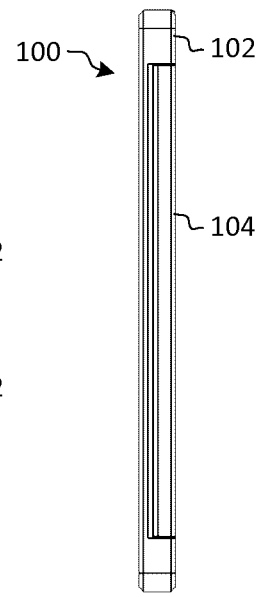
Figure 1G
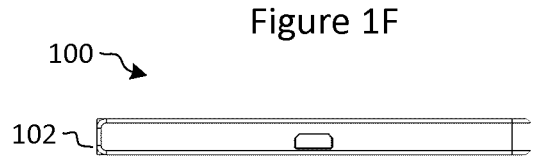
Figure 1H

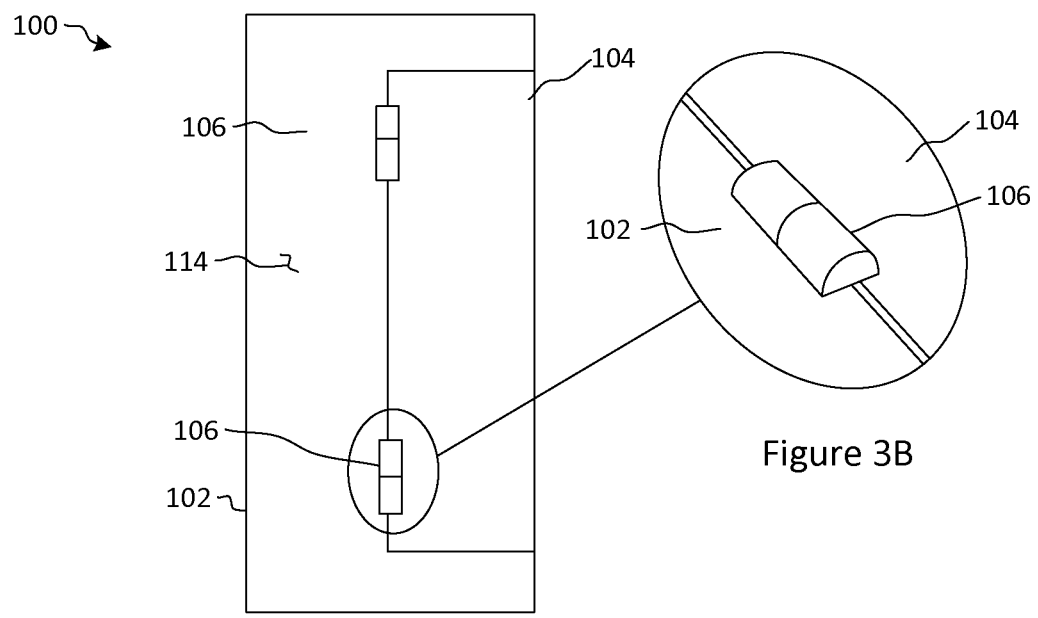
Figure 3A
Figure 3B
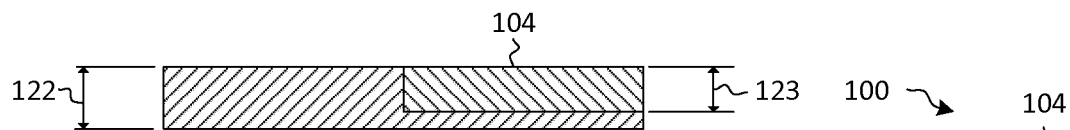
Figure 5A
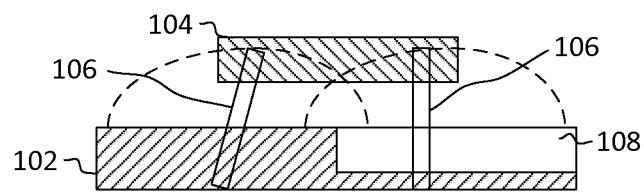
Figure 5B
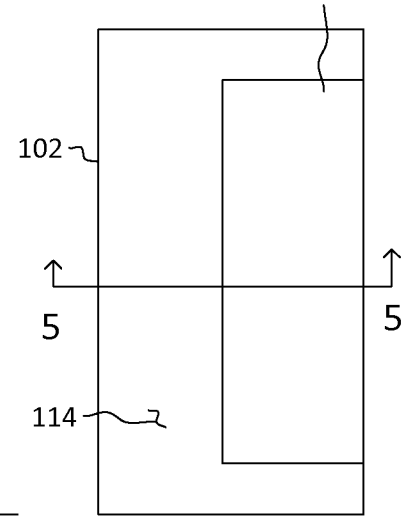
Figure 4
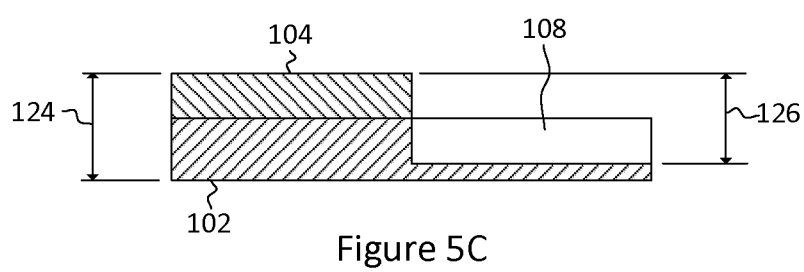
Figure 5C

MOBILE DEVICE SYSTEMS AND METHODS

TECHNICAL FIELD

The embodiments disclosed herein relate to mobile devices, and, in particular to systems, apparatuses, and methods for mobile devices.

INTRODUCTION

The following paragraphs are not an admission that anything discussed in them is prior art or part of the knowledge of persons skilled in the art.

Attributes of a virtual keyboard that are desirable for two handed typing may not be the same as those that are desirable for one handed typing. On mobile handheld devices with smaller screen size such as a diagonal screen size of approximately 100 mm (3.9 inches) and a 16×9 aspect ratio a user may be able to type in a satisfactory manner one handed with a traditional virtual keyboard while holding the device in a portrait orientation. When the diagonal screen size of the mobile handheld device gets above 125 mm (4.9 inches) (16×9 aspect ratio) many users may struggle to use the traditional virtual keyboard with one hand and might just wait until they are in a situation where they are able to use two hands. Examples of situations where the user may only have one hand available are: the other hand is occupied holding a bag, an umbrella, a cup of coffee, when the user is on a train or bus and needs to hold onto a strap or rail, or where the user only has one hand.

A traditional mobile device includes a touchscreen centered in a horizontal direction about a screen centerline. The screen centerline and the device centerline are co-linear and as such what is displayed on the touchscreen will have a display centerline that is the same as the screen centerline such that the displayed software components are centered horizontally on the touchscreen and centered horizontally on the traditional mobile device.

SUMMARY

According to some embodiments, there is a mobile device including a first body portion containing operational components of the mobile device, wherein the first body portion has a display surface and a rear surface opposite the display surface, wherein the rear surface has a cavity, a second body portion coupled to the first body portion on the rear surface, containing auxiliary operational components of the mobile device, and a coupling hinge coupling the first body portion to the second body portion and for providing movement of the second body portion from a first position to a second position. In the first position, the second body portion is recessed within the cavity of the first body portion. In the second position, the second body portion is positioned on the rear surface of the first body portion and the cavity is at least partially open to form a grip area.

In an embodiment, when the mobile device is in the second position, a keyboard on the display of the mobile device is in a one handed configuration.

In an embodiment, when the mobile device is in the first position, the mobile device has a first thickness and, in the second position, the mobile device is thicker than the first thickness in the grip area and thinner than the first thickness in the area of the cavity.

In an embodiment, the second body portion has a second thickness, and the grip area has a thickness of at least the first thickness and the second thickness.

In an embodiment, the coupling hinge is a double hinge mechanism for providing rotational coupling of the second body portion relative to the first body portion.

In an embodiment, the coupling hinge is a four bar linkage for providing translational coupling of the second body portion relative to the first body portion.

In an embodiment, the coupling hinge is a simple hinge for providing rotational coupling of the second body portion relative to the first body portion.

In an embodiment, when in the first position, the second body portion extends to an edge of the mobile device.

In an embodiment, the first body portion includes a relief to allow a user's fingers to engage the second body portion.

In an embodiment, the auxiliary operational components include a battery.

In an embodiment, the second body portion is removable from the first body portion such that the battery can be swapped.

In an embodiment, the mobile device further includes a retention system for holding the position of the second body portion relative to the first body portion.

In an embodiment, the retention system includes a single magnet or multiple magnets on the second body portion and a complimentary magnet or ferromagnetic components on the first body portion.

In an embodiment, the retention system includes a spring and cam system in the coupling hinge for providing a force to maintain the position of the second body portion relative to the first body portion.

In an embodiment, the retention system holds the second body portion in the first and second positions.

According to further aspects, there is a method for displaying a virtual keyboard on a display of a mobile device. The method includes receiving a triggering event, and displaying the virtual keyboard in a one-handed configuration optimized for use with exactly one hand of a user. The one-handed configuration includes a virtual key grouping located closer to a side of the device and related to the exactly one hand of the user.

According to further aspects, there is a mobile device having a display operable to display a virtual keyboard. The mobile device includes a processor configured to receive a triggering event and a touchscreen display for displaying the virtual keyboard in a one-handed configuration optimized for use with exactly one hand of a user. The one-handed configuration includes a virtual key grouping located closer to a side of the device and related to the exactly one hand of the user.

In an embodiment, the virtual keyboard is near a top edge of the display.

In an embodiment, the virtual keyboard includes a gesture reference area that is located adjacent to the virtual key grouping on the opposite side of the exactly one hand of the user.

In an embodiment, the method further includes performing a particular action when a specific gesture is performed by a user based on the gesture reference area.

In an embodiment, the gesture reference area includes any one or more of gestures performed on the virtual keyboard to insert punctuation and symbols, an automated word correction that will be inserted if the user hits a designated key, and actions that will be performed to a specific search term entered in a text box when a specific gesture is completed.

In an embodiment, the gesture reference area does not have to be directly interacted with to select elements shown in the gesture reference area.

In an embodiment, the triggering event includes a manual trigger that is actively selectable by the user.

In an embodiment, the manual trigger includes any one or more of a physical key, a deployed mechanism, a virtual key, or a menu item.

In an embodiment, the triggering event includes an automatic trigger that recognizes the way the mobile device is being held.

In an embodiment, the automatic trigger includes an accelerometer or set of sensors.

In an embodiment, the mobile device is a tablet and the virtual keyboard does not extend the full width of the touchscreen display.

In an embodiment, the virtual keyboard does not extend to half the width of the touchscreen display.

In an embodiment, the virtual keyboard overlays an application content area of the touchscreen display.

In an embodiment, the one-handed configuration includes enlarged virtual keys that are enlarged from a default size.

In an embodiment, the processor includes a prediction engine that determines what keys will be most likely targeted next by a user and wherein the one-handed configuration includes enlarged virtual keys that are enlarged from a default size based on the prediction engine.

In some aspects there is a mobile device having a device centerline. The mobile device includes a touchscreen on a front surface of the mobile device and having a screen centerline offset from the device centerline, and device components on the front surface. The touchscreen displays software components. The software components have a display centerline and are displayed at a compensating offset such that the display centerline is co-linear with the device centerline.

In an embodiment, the compensating offset is the distance from the device centerline to the screen centerline.

In an embodiment, the software components are centered horizontally on the mobile device.

In an embodiment, the mobile device further includes device components exposed on the front surface and located along a first edge of the mobile device.

In an embodiment, the device components include any one or more of an earpiece speaker, a front facing camera, a proximity sensor, a home button, antenna elements, and clearance area.

In an embodiment, the device components include two earpiece speakers and two front facing cameras.

In an embodiment, the device centerline passes through the geometric center of the front surface of the mobile device such that there is equal surface area on both sides of the device centerline.

In an embodiment, the screen centerline is offset from the device centerline based on an area on the front surface provided for the device components.

In an embodiment, the software components include a virtual keyboard centered on the mobile device.

In an embodiment, the virtual keyboard is a QWERTY keyboard and the display centerline passes between the center of the T key and the center of the Y key.

In an embodiment, the touchscreen displays an extra space created by the compensating offset and the extra space includes added keys.

In an embodiment, the software components include a virtual device button bar centered around the display centerline.

In an embodiment, the software components include an application icon grid centered around the display centerline.

In some aspects there is a method for displaying software components on a touchscreen of a mobile device. The method includes determining a compensating offset based on an offset between a device centerline of the mobile device and a screen centerline of the touchscreen, and displaying the software components at the compensating offset such that the display centerline is co-linear with the device centerline and the software components are centered on the mobile device.

In an embodiment, the compensating offset is determined based on the non-zero distance from the device centerline to the screen centerline.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings:

FIGS. 1A-1H illustrate a rear perspective view, a rear view, a front perspective view, a top view, a left side view, a front view, a right side view and a bottom view, respectively, of a mobile device having a deployable grip in an undeployed position, in accordance with an embodiment;

FIGS. 3A and 3B illustrate a rear view and a detailed view of a mobile device having a deployable grip and a simple hinge, in accordance with an embodiment;

FIG. 4 illustrates a rear view of a mobile device having a four bar linkage hinge, in accordance with an embodiment;

FIGS. 5A-5C illustrate a cross section along 5-5 of FIG. 4 with a grip in an undeployed position, an intermediate position, and a deployed position, respectively, of the mobile device of FIG. 4;

DETAILED DESCRIPTION

Figure 1A:
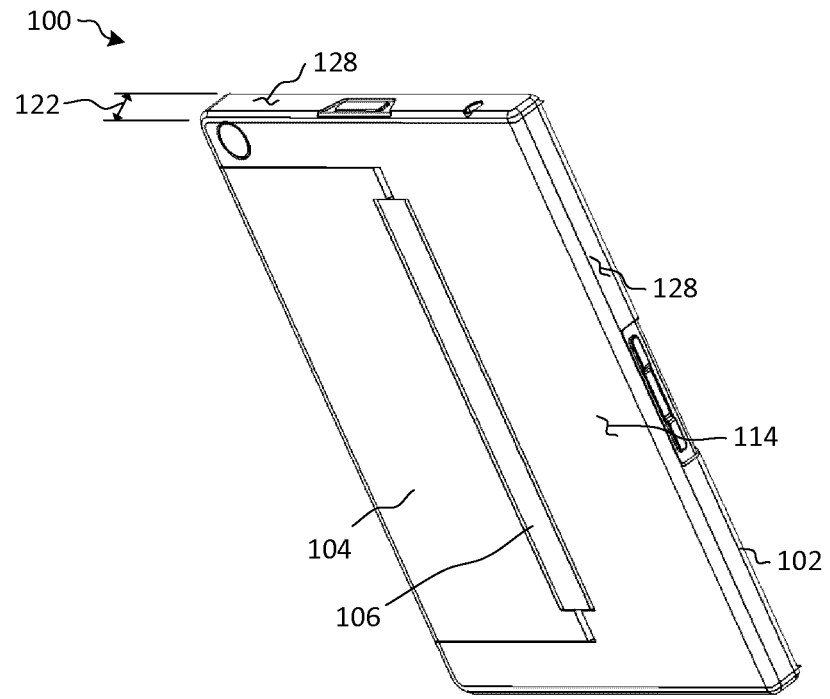
Figure 1B:
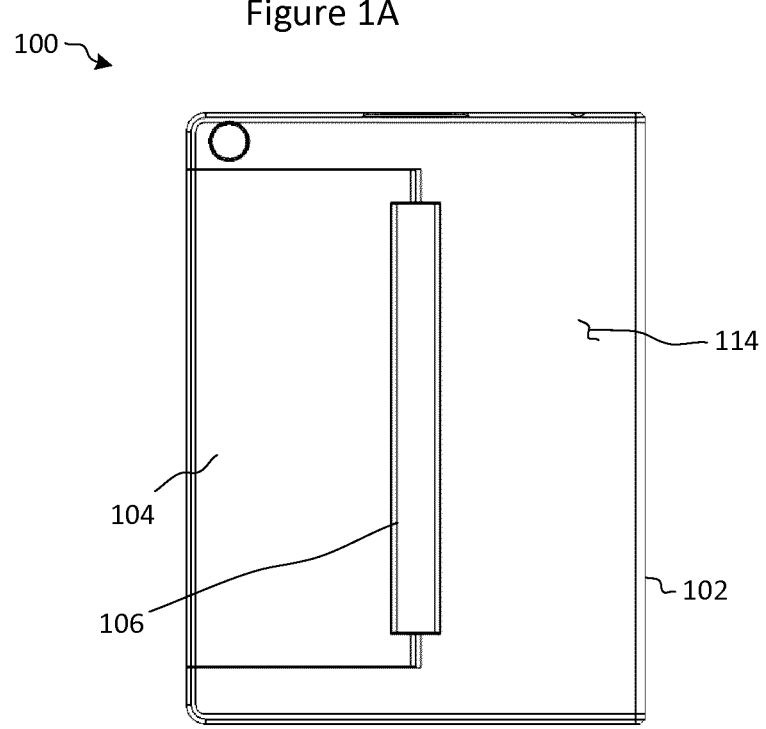

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below. It is possible that an apparatus or process described below is not covered by any of the claimed embodiments. Any embodiment disclosed below that is not claimed in this document may be the subject matter of another protective instrument, for example, a continuing patent application, and the applicants, inventors or owners do not intend to abandon, disclaim or dedicate to the public any such embodiment by its disclosure in this document.

FIGS. 1A to 5 illustrate a mobile device 100, in accordance with an embodiment. The mobile device 100 includes a first body portion 102, a second body portion 104 or deployable grip, and a coupling hinge 106 coupling the first body portion 102 to the second body portion 104. The second body portion 104 is operable to move from an undeployed position (FIGS. 1A-1H) to a deployed position (FIGS. 2A-2H) to create a grip area 120 on the mobile device 100. The mobile device 100 may include any one of a cell phone, smart phone, tablet, mobile computer, GPS, digital notepad, ereader, digital camera etc. The mobile device 100 may contain various wireless communication functionality, including hardware and software components, as is known in the art.

The first body portion 102 is of a first thickness 122 and contains operational components of the mobile device 100. The operational components of the mobile device 100 include, for example, electrical hardware components such as speakers, an antenna, a processor, memory, and a power supply.

The first body portion 102 includes a display and user input surface 112 and a rear surface 114 opposite the display and user input surface 112. The display and user input surface 112 includes a user input, such as a touchscreen and display screen, one or more input buttons, and/or audio inputs and outputs. The input buttons may include a power button, volume buttons, a home button, or a keyboard composed of a collection of buttons. As well there may be buttons or switches that are available to the user on any of the edge surfaces 128. The mobile device 100 may also include a speaker, receiver, microphone, a printed circuit board with processor and other components as well as an antenna. The first body portion 102 includes a housing for holding the components together. The housing may include an applicable plastic or metal and may contain screws, snaps, or adhesives.

In an embodiment, the second body portion 104 includes a battery for the mobile device 100. For example, the second body portion 104 may include a housing for storing the mobile device battery. Other components may be contained in the second body portion 104, for example components for near field communication (NFC) or wireless charging.

Where the mobile device 100 is a smartphone, the screen may include a diagonal screen size between 114 mm (4.5 inches) and 152 mm (6 inches). In other applications such as a tablet the screen can be formatted in a portrait or landscape orientation and the diagonal screen size could be in a range between 152 mm (6 inches) to 304.8 mm (12 inches).

The rear surface 114 of the first body portion 102 includes a cavity 108 such as a step, full cavity, or partial cavity for nesting the second body portion 104. The cavity 108 may also include space for the coupling hinge 106. The rear surface 114 includes the coupling hinge 106 to connect to the second body portion 104.

As shown in FIGS. 1A-2H, the coupling hinge 106 is a double hinge assembly. The double hinge assembly has two hinge axes to allow rotation of the second body portion 104 approximately 180 degrees. Each hinge axis allows a rotation of approximately 90 degrees. The double hinge assembly may allow for the second body portion 104 to sit flush in the cavity 108 and the coupling hinge 106 to sit flush or sub-flush with the rear surface 114 of the mobile device 100 when in the undeployed position. The coupling hinge 106 may use a more complex mechanism (e.g., than a simple hinge e.g., of FIGS. 3A and 3B) to create a virtual hinge point while keeping the hinge components below or flush with the rear surface 114. The mobile device may also include a mechanism for accurately controlling the start and end position of the second body portion 104.

FIGS. 3A and 3B show an alternative mobile device 100 having a simple style hinge 106. The simple hinge 106 has protrusions on the back surface 114 for the hinge 106 when the mobile device 100 is in the undeployed position. The simple hinge 106 may provide for an easier implementation while the hinge axis is located on the rear surface 114, where the rear surface 114 is flat. Where the simple hinge 106 protrudes off of the rear surface 114, other protrusions and cavities or partial cavities could also be placed on the rear surface 114 and the second body portion 104 so that the hinge 106 is one of a plurality of elements that protrudes off of the rear surface 114. The simple hinge 106 may be of a small diameter and have electrical connections and positional retention elements located on another area of the mobile device 100.

FIGS. 4 and 5A-5C show an alternative mobile device 100 having a coupling mechanism 106 such as a four bar linkage. The second body portion 104 moves from the undeployed position (FIG. 5A), to the intermediate position (FIG. 5B) and to the deployed position (FIG. 5C) and back. The four bar linkage 106 allows the mobile device to translate into position, rather than rotating about the hinge 106 into position (as shown in FIGS. 1A-2H).

The four bar linkage 106 may provide the second body portion 104 to be reasonably flush with the rear surface 114 of the first body portion 102 when in the undeployed position. For example, the second body portion 104 may be reasonably flush where there is no protrusion of the second body portion 104 on with respect to the rear surface 114. The coupling mechanism 106 may include electrical connections running through the coupling mechanism 106. For example, wires connecting the electronic components pass through a hollow hinge or the coupling hinge has elements to provide electrical connections.

The four bar linkage 106 provides movement of the second body portion 104 without significant rotation of the second body portion 104 when traveling between the deployed position and the undeployed position.

Figure 6:
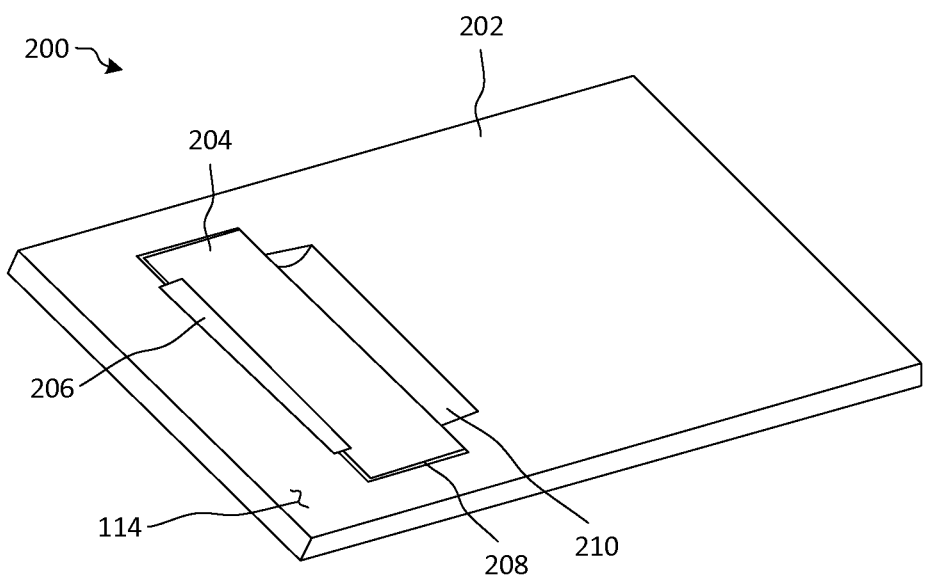
FIG. 6 illustrates a rear perspective view of a tablet mobile device having a deployable grip, in accordance with an embodiment.

FIG. 6 illustrates a mobile device 200 such as a tablet, in accordance with an embodiment. The mobile device 200 includes a cavity 208 where a second body portion 204 and the coupling hinge 206 may not extend to the edge of a first body portion 202. Instead, a relief or release mechanism 210 allows a user's fingers to deploy the second body portion 204. In further embodiments, the mobile device 200 may be other larger mobile devices such as a digital multi-meter or a mobile terminal barcode scanner.

The second body portion 104 moves between a first, undeployed position (shown, for example in FIGS. 1A-1H, 3A, 3B, 4, 5A, 6, and 7) and a second, deployed position (shown in FIGS. 2A-2H, 5C, 10, 11, and 12). The second body portion 104 may pass through an intermediate position (shown in FIGS. 5B, 8, and 9) to go from and to the undeployed position and the deployed position.

In the undeployed position, the second body portion 104 is recessed within the cavity 108 of the first body portion 102 such that the mobile device 100 is thin and flat. In the deployed position, the second body portion 104 is positioned on the rear surface 114 of the first body portion 102 and the cavity 108 is at least partially open such that the mobile device 100 is thick in one area and thin in another area. When in the first position, the mobile device 100 has the first thickness 122 and, in the second position, the mobile device 100 is thicker than the first thickness 122 in the grip area 120 and thinner than the first thickness 122 in the area of the cavity 108.

In the undeployed position, the mobile device 100 may be thinner than in the deployed position, form a simpler overall shape, be generally symmetric, and have a center of gravity close to its geometric center. The mobile device 100 may be easier to store, for example, when carried in a user's pocket.

Figure 2A:
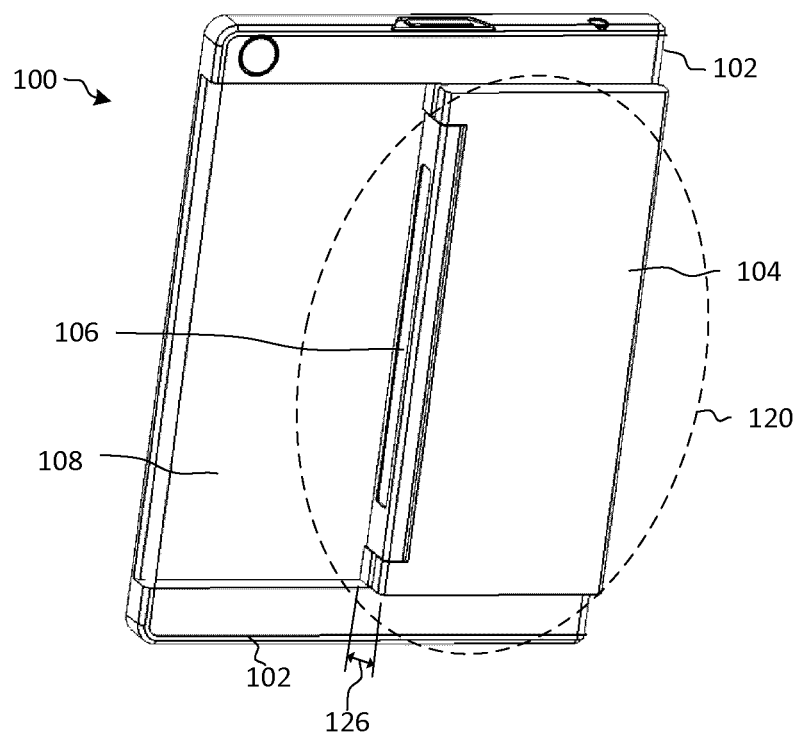
FIGS. 2A-2H illustrate a rear perspective view, a rear view, a front perspective view, a top view, a left side view, a front view, a right side view and a bottom view, respectively, of the mobile device of FIG. 1A with the deployable grip in a deployed position.
Figure 2B:
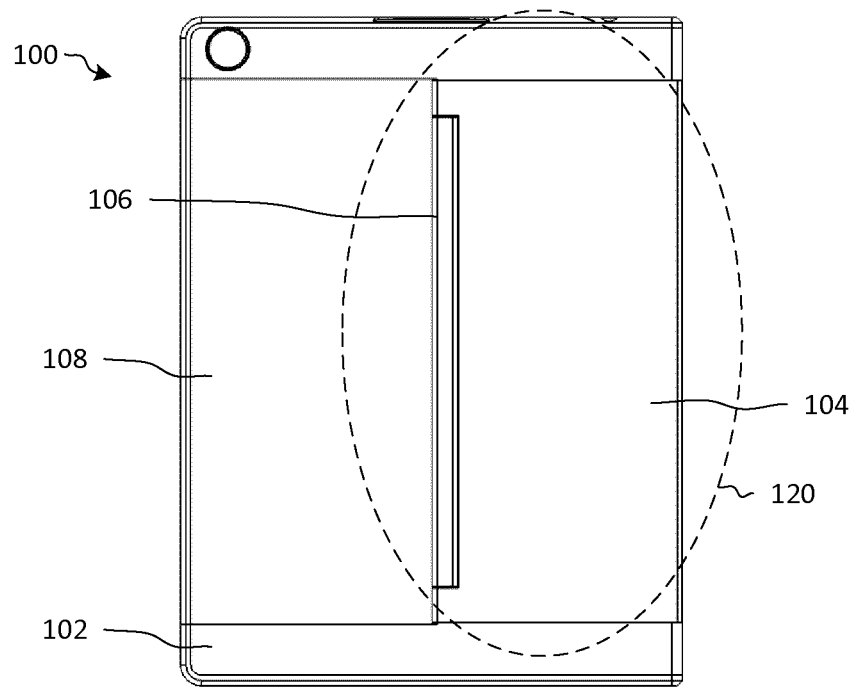
Figure 2C:
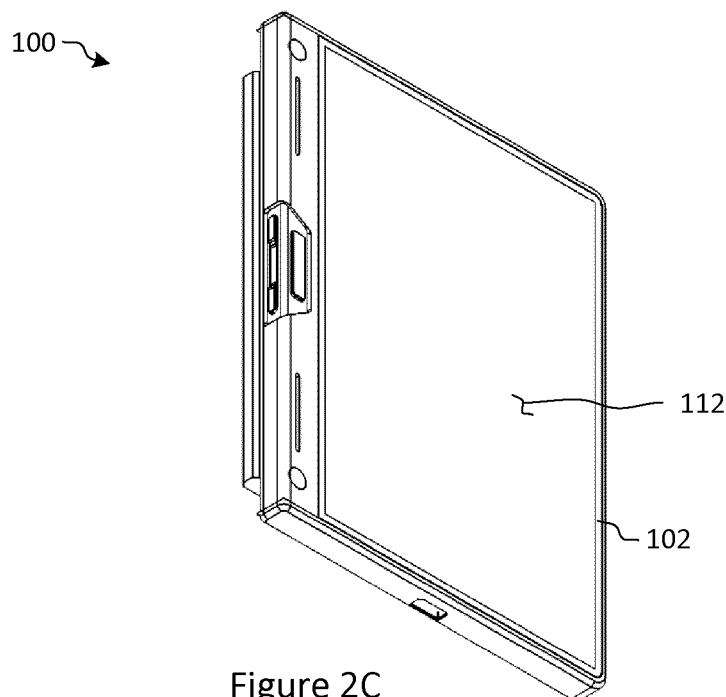
Figure 2D:
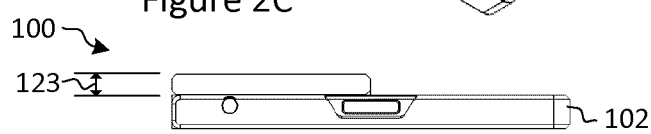
Figures 2E, 2F, 2G:
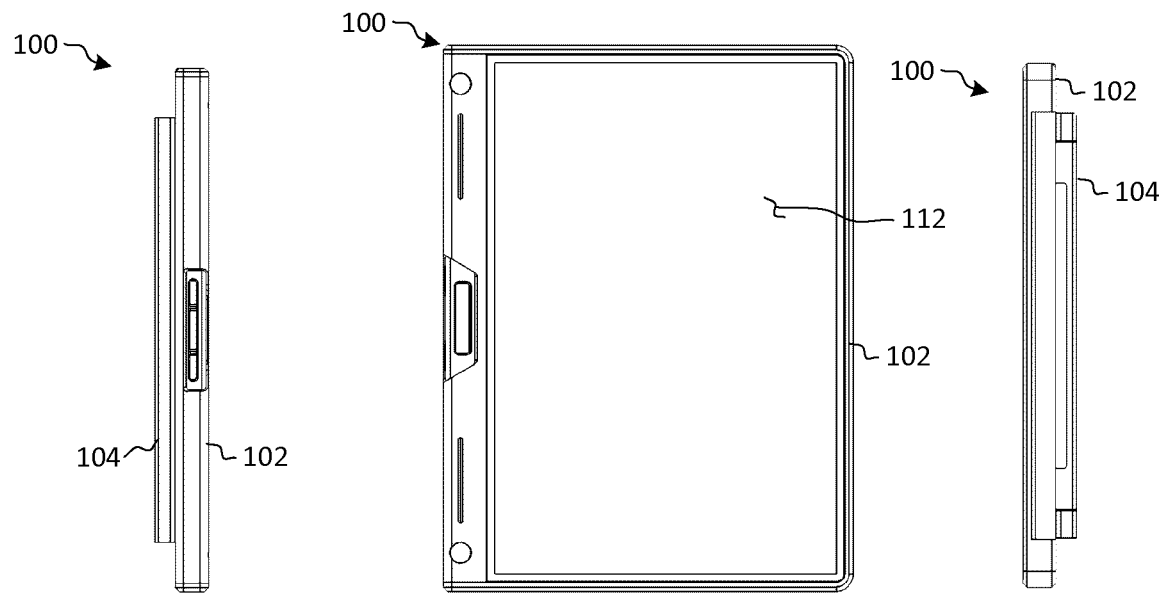
Figure 2H:

In the deployed position, the second body portion 104 is moved out of the cavity 108 of the first body portion 102 and moved toward the grip area 120 of the first body portion 102. The grip area 120 has a grip thickness 124 (e.g. shown in FIGS. 2D, 5C) that may be at least as thick as the total of the device thickness 122 (e.g. shown in FIGS. 1A, 5A) plus a thickness 123 (e.g. as shown in FIGS. 2H, 5A) of the second body portion 104. In an embodiment, when in the deployed position, the grip area 120 is formed where the depth 126 (e.g. as shown in FIGS. 2A, 5C) of the grip area 120 on the rear surface 114 of the mobile device 100 is approximately twice the thickness of the second body portion 104.

In an embodiment, the second body portion 104 includes primarily the battery (not shown), in addition to other mobile device components. Where the second body portion 104 includes the battery, the entire second body portion 104 of the device may be removable from the first body portion 102 allowing for the battery to be swapped. Where the second body portion 104 is removed, the hinge coupling 106 may stay with second body portion 104 or it might stay with the first body portion 102 or it may separate where a portion goes with the first body portion 102 and a portion goes with the second body portion 104.

The second body portion 104 may move between the undeployed position and deployed position by rotation and/or translation depending on the type of coupling hinge 106 being used.

In an embodiment, the interim position may include a setting mechanism that sets the second body portion 104 to any interim position. The interim position may provide a functional use such as a stand function. The stand function may allow for portrait and/or landscape orientation (e.g. of the display) of the first body portion 102 where the mobile device 100 is provided upright or angled with respect to a support surface.

In an embodiment, the second body portion 104 is held in the undeployed position as well as the deployed position. The mobile device 100 may include a retention system 116 such as a magnet that holds the position of the second body portion 104 to the first body portion 102. The retention system 116 may include a single magnet or multiple magnets as well as complimentary magnets or ferromagnetic components.

The retention system 116 may include a spring and cam system in the coupling hinge 106 that provides a force to maintain the second body portion 104 in the undeployed or deployed position. In a further embodiment, the retention system 116 includes a magnetic system and a spring and cam system. The retention system 116 may include a mechanical spring clip system and having a release system. The release system may hold the second body portion 104 in position with the required force to overcome the clip system. Where, the mobile device 100 has an intermediate position, the retention system 116 may maintain the mobile device 100 in the intermediate position.

Turning now to FIGS. 7-12, which illustrate a user's hand 110 moving the second body portion 104 from the undeployed to deployed position. When the user moves the second body portion 104 out of the undeployed position, the movement may trigger an 'on' switch or wakeup switch to activate the mobile device 100. Similarly, moving the second body portion 104 into the undeployed position may act as an 'off' switch to deactivate the mobile device 100 (e.g., shut off or sleep mode).

Software may operate differently when the second body portion 104 is deployed on the right hand side relative to the user facing the screen and second body portion 104 is deployed on the left hand side relative to the user facing the screen. Software elements may operate differently when the second body portion 104 is undeployed relative to how the software elements may operate when the second body portion 104 is deployed.

In certain embodiments, an element of the mobile device 100 is only accessible in the mode where the second body portion 104 is deployed. For example, where the mobile device 100 is a digital camera, a lens is covered by the second body portion 104 in the undeployed position and exposed in the deployed position. In a further embodiment, the mobile device 100 is a digital notepad having a digital stylus stored and inaccessible where the mobile device 100 is in the undeployed position and the digital stylus is removable when in the deployed position. Software may be configured to automatically lock the mobile device 100 when the second body portion 104 is in the undeployed position and unlock the mobile device 100 when the second body portion 104 is moved to the deployed position.

In an embodiment, where the second body portion 104 is in the undeployed position, the mobile device 100 is approximately 74 mm (2.9 inches) wide, approximately 140 mm (5.5 inches) in height, and has a thickness of approximately 10 mm (0.39 inches). The screen may be approximately 140 mm (5.5 inches) in size measured diagonally. On this size of mobile device 100, it may become difficult for the user to cradle the mobile device 100 securely with the user's fingers 110 and operate the touchscreen with the user's thumb of the same hand. If the user's fingers reach all the way across the rear surface 114 to securely get a grip on the mobile device 100 then the user's thumb cannot reach many parts of the touchscreen. Where the user supports the device by having their fingers not reach across the entire width of the rear surface 114 their thumb may reach most of the touchscreen but may prevent a secure grip on the mobile device 100.

Figure 7:
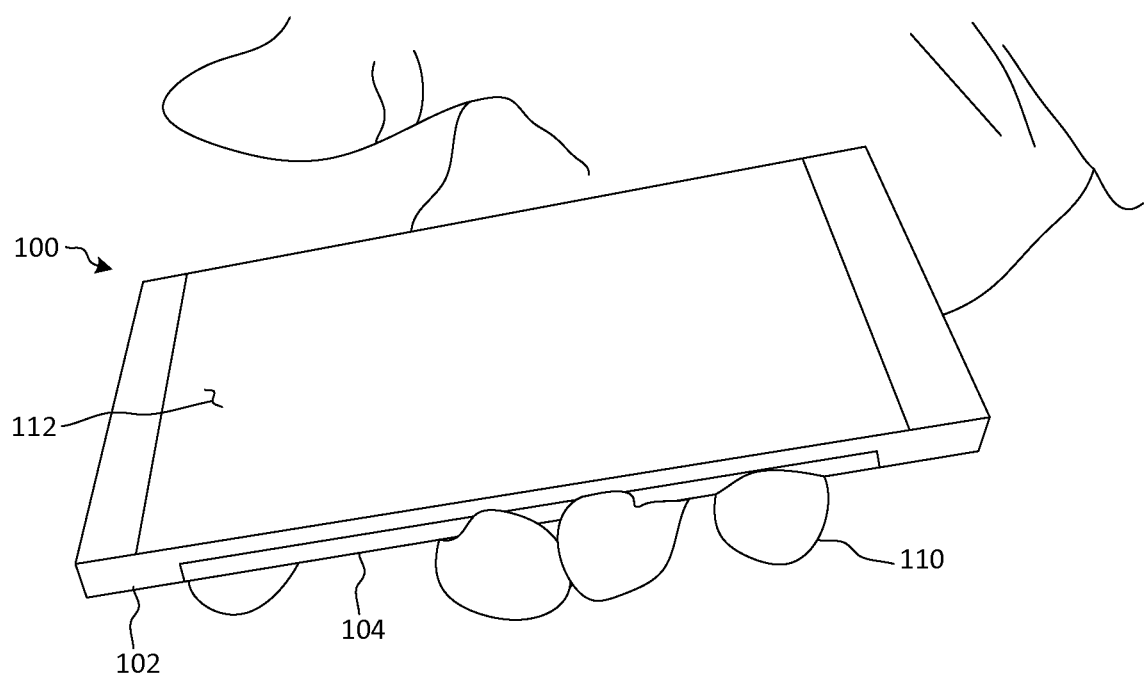
FIGS. 7-12 illustrate in-use views of the mobile device of FIG. 1A, in an undeployed position, a first intermediate position, a second intermediate position, a bottom view of a deployed position, a rotated bottom view of the deployed position, and a front view of the deployed position, respectively.
Figure 8:
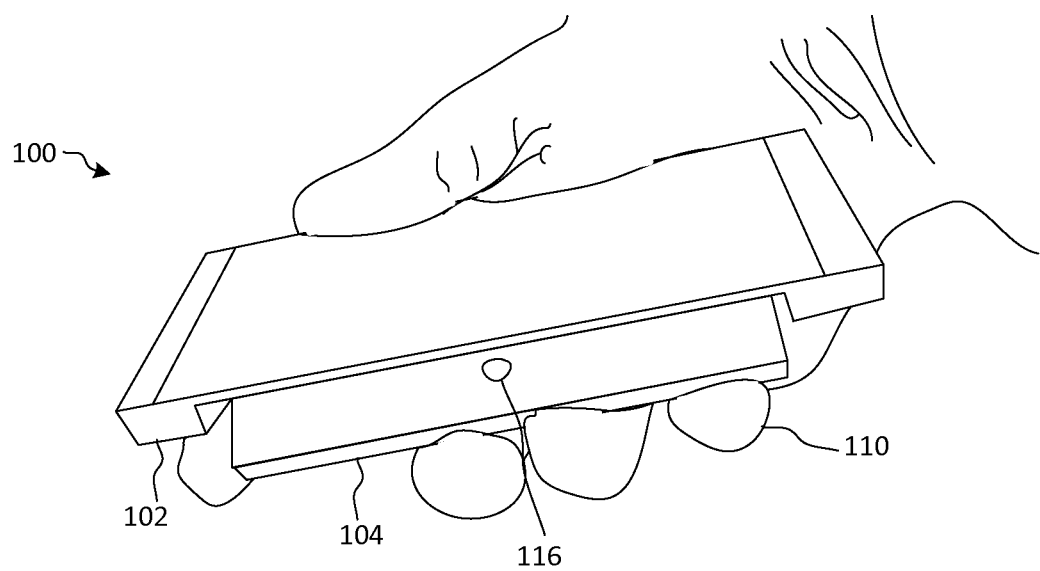
Figure 9:
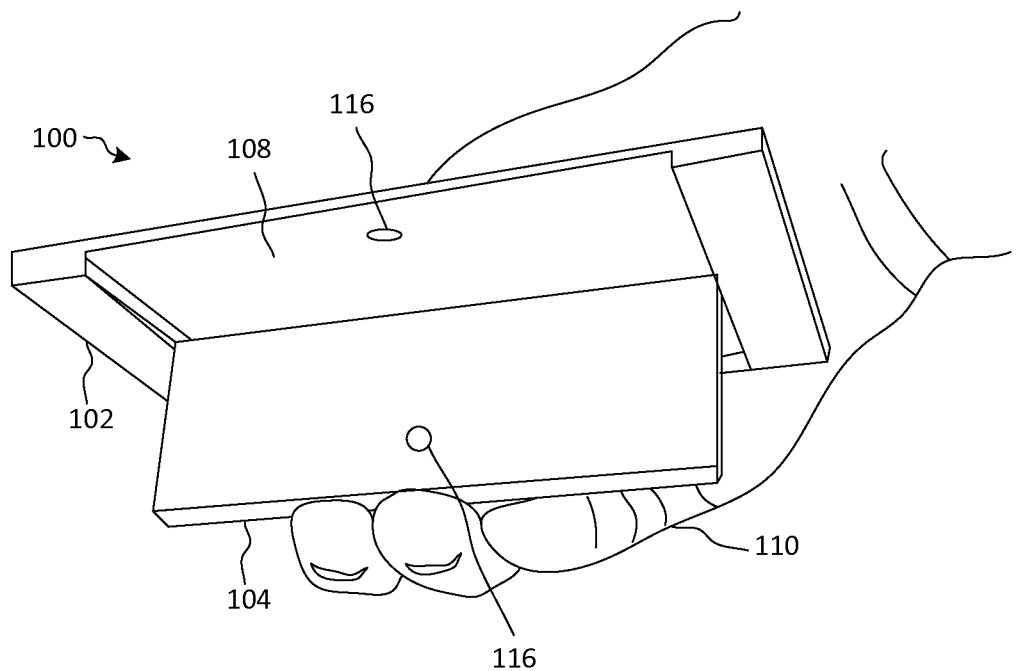
Figure 10:
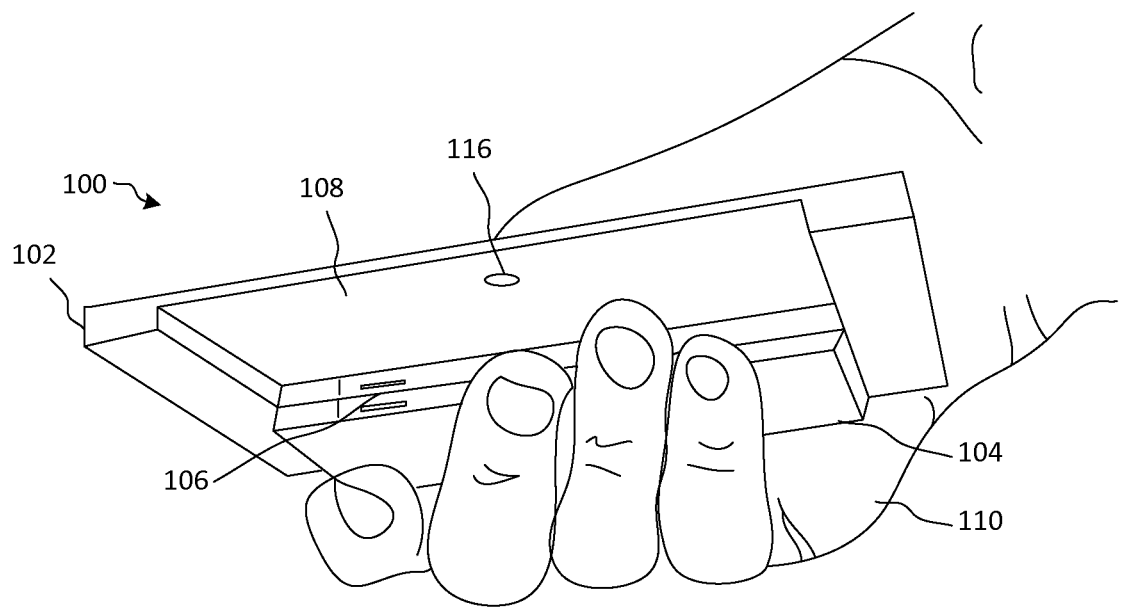
Figure 11:
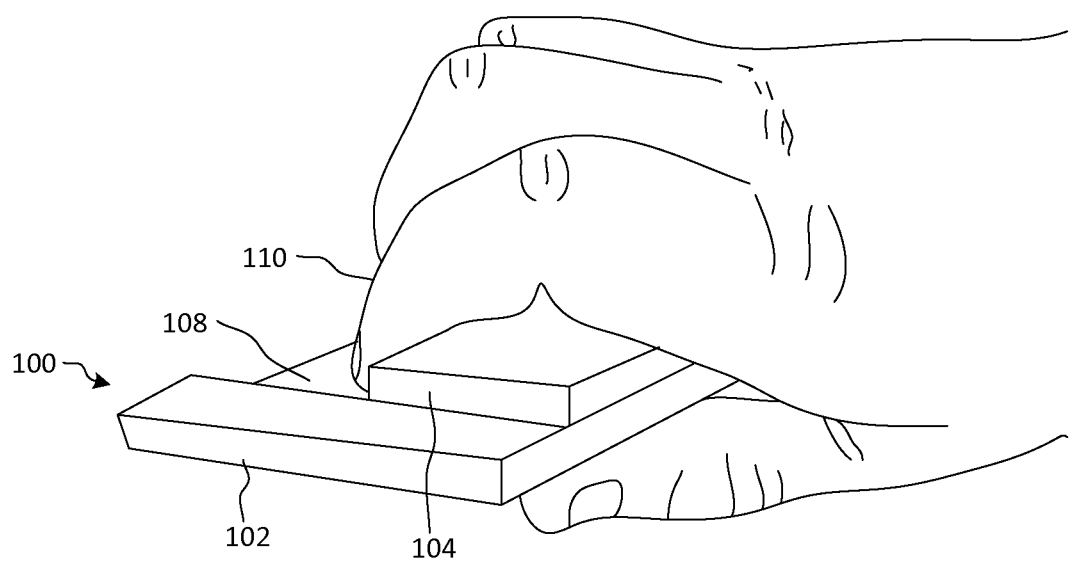
Figure 12:
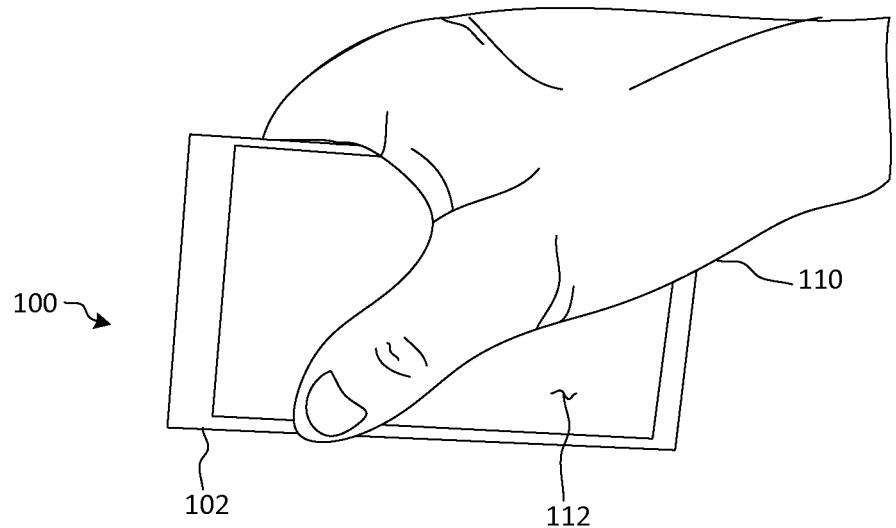

As shown in FIG. 7, to deploy the second body portion 104, the user reaches their fingers across the back of the device to release the second body portion 104 by prying gently between the first body portion 102 and the second body portion 104 on the side of the mobile device 100. As shown in FIG. 8, the user overcomes the retention force of the retention system 116 and pulls the second body portion 104 over (FIG. 9) with their fingers on to the rear surface 114 until the second body portion 104 has rotated into the deployed position (FIGS. 10-12).

In a particular embodiment, in the deployed position, the grip area 120 is approximately 37 mm (1.5 inches) (half of the device width) and it has the depth 126 in the middle of the device of approximately 12 mm (0.47 inches) and an overall device thickness of approximately 16 mm (0.63 inches). This geometry may allow the user to get a secure grip with the finger tips across the back of the mobile device 100 while allowing the user's thumb to be able to reach most of the touchscreen (e.g., as shown in FIG. 12). The geometry of the deployed position may allow the user to hold onto the device with a more comfortable hold.

For single handed use, the user can rotate the device where they are facing the screen with the other hand while keeping the grip area 120 is on the other side. The application displayed on the screen rotates on the touchscreen through 180 degrees. This rotation may be done automatically by the software using the accelerometer to identify the orientation of the mobile device 100. When in the deployed position, the user's grip may be improved while holding the device with the touchscreen in a landscape orientation.

To move the mobile device 100 from the deployed position to the undeployed grip position, the user may reach their fingers across the whole device and across the cavity 108. Using their thumb the user pries between the second body portion 104 and first body portion 102 on the grip side of the device. There may be a second retaining mechanism (not shown) that keeps the second body portion 104 in the deployed position. Once any retaining force is overcome, the thumb swings the second body portion 104 back over to the undeployed position where the mobile device 100 may be in a more comfortable configuration to be stored (e.g. in the user's pocket).

The user may move the second body portion 104 between the deployed and undeployed positions using both hands. For example, one hand is used to hold the mobile device 100 and the other hand moves the second body portion 104.

Figure 13:
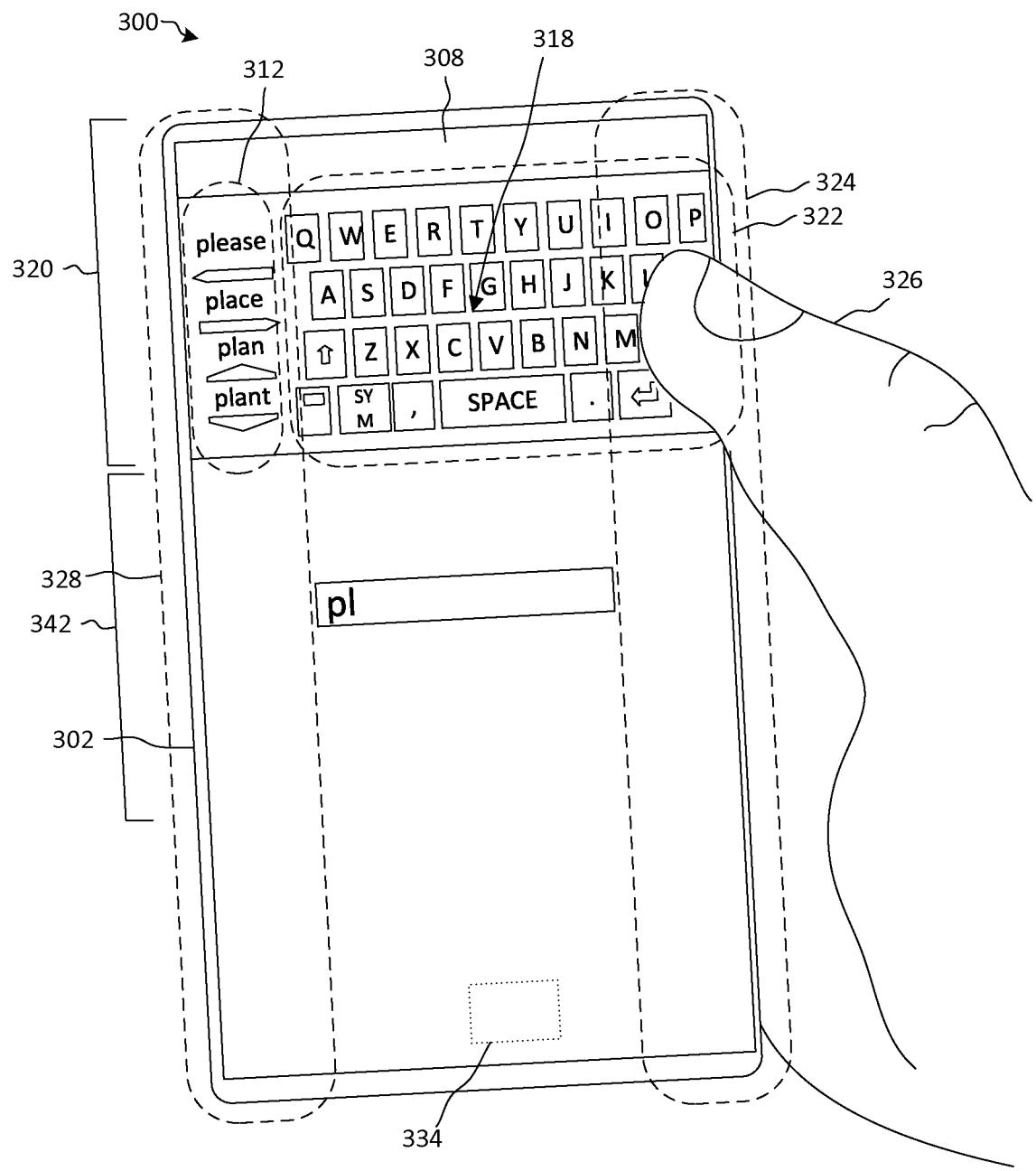
FIG. 13 illustrates an in-use view of a mobile device having a display showing a virtual keyboard, in accordance with an embodiment.
Figure 14:
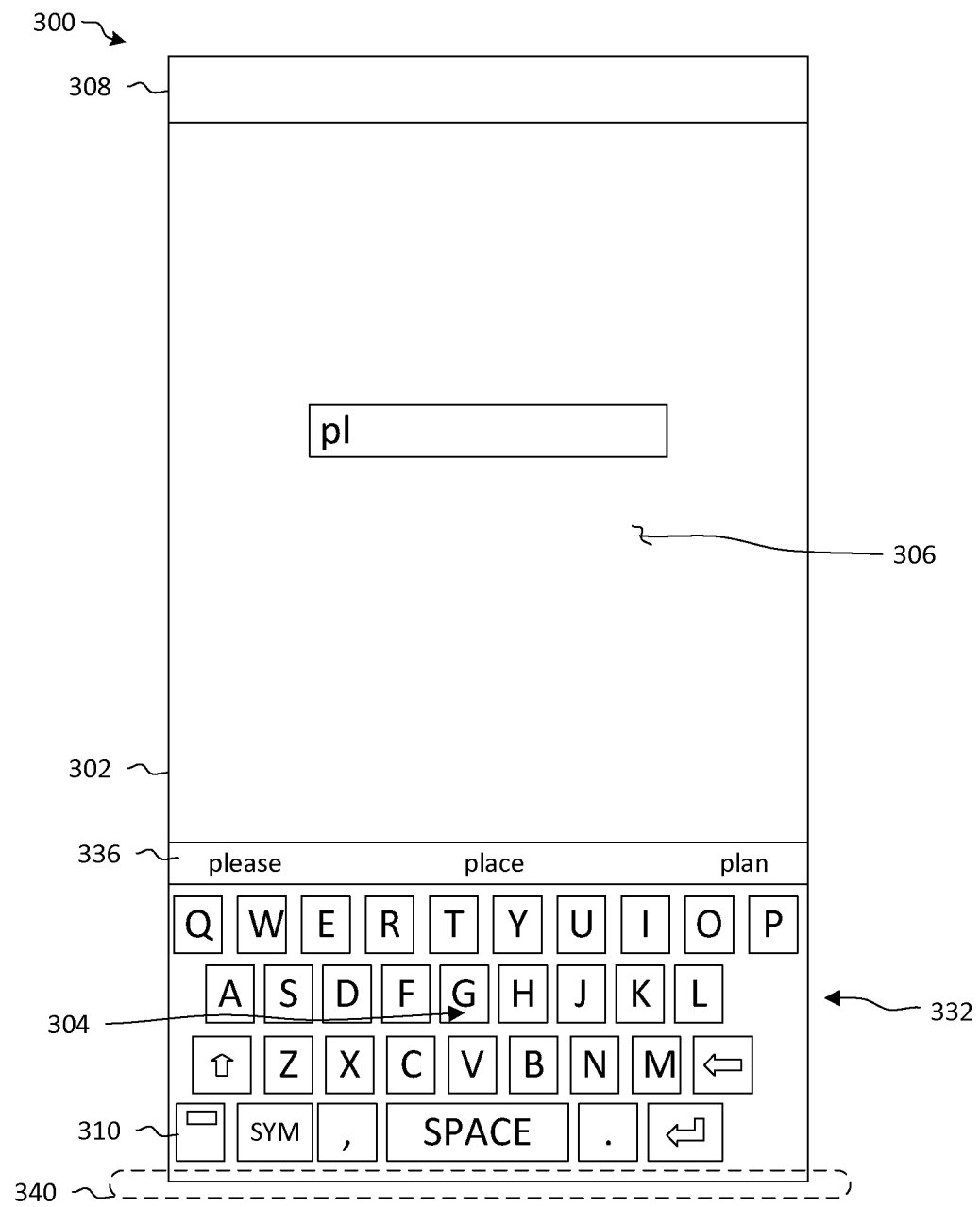
FIG. 14 illustrates a diagram of the display of the mobile device of FIG. 13 having a conventional keyboard.

Turning now to FIGS. 13-24, conventional virtual keyboards on handheld mobile devices may be optimized for use with two hands. Common ergonomic positions to type with two hands are by cradling the device in both hands and using both thumbs to type on the virtual keyboard or by holding the device in one hand and using the index finger of the other hand to type. Even though in the second example one is only typing with one hand, two hands are used. Two handed typing is using two hands while typing on a handheld mobile device while one handed typing is using only one hand. FIG. 14 illustrates the mobile device with a virtual keyboard configured in a traditional way that is in a mode for two hand typing.

FIGS. 13-24 illustrate mobile devices 300 displaying a virtual keyboard 304 on a touchscreen display 302. The virtual keyboard 304 may be displayed in a one handed virtual keyboard 318 orientation.

The one handed virtual keyboard 318 may be positioned near a top area 320 of the touchscreen display 302. The one handed virtual keyboard 318 includes a virtual key grouping 322 located closer to a side 324 (e.g., right side 324 as shown in FIG. 13, or left side 328) of the mobile device 300. The side 324 is nearest to the hand 326 operating the mobile device 300. The one handed virtual keyboard 304 includes a virtual keyboard gesture reference area 312 that is located adjacent to the virtual key grouping 322 and is on the opposite side 328 of the hand 326 operating the mobile device 300. The virtual keyboard 304 is optimized for use with the one hand 326 such that the thumb of the user can reach the keys in the virtual key grouping 322 while the mobile device 300 is held by only one hand 326. The virtual keyboard gesture reference area 312 does not have to be directly interacted with to have elements selected that are shown in virtual keyboard gesture reference area 312.

Figure 20:
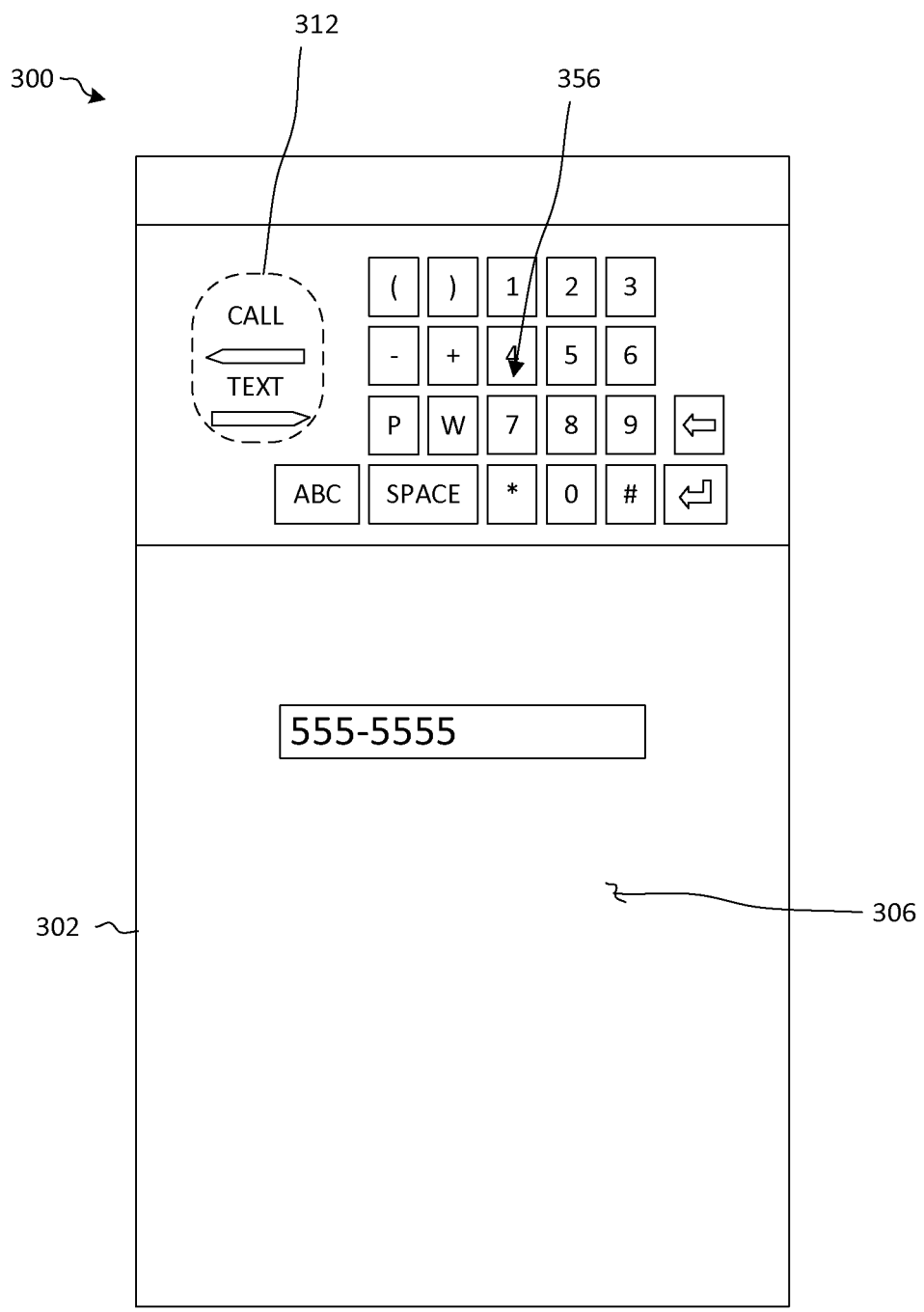
FIG. 20 illustrates a diagram of a display having a virtual keyboard having a number pad, in accordance with an embodiment.
Figure 21:
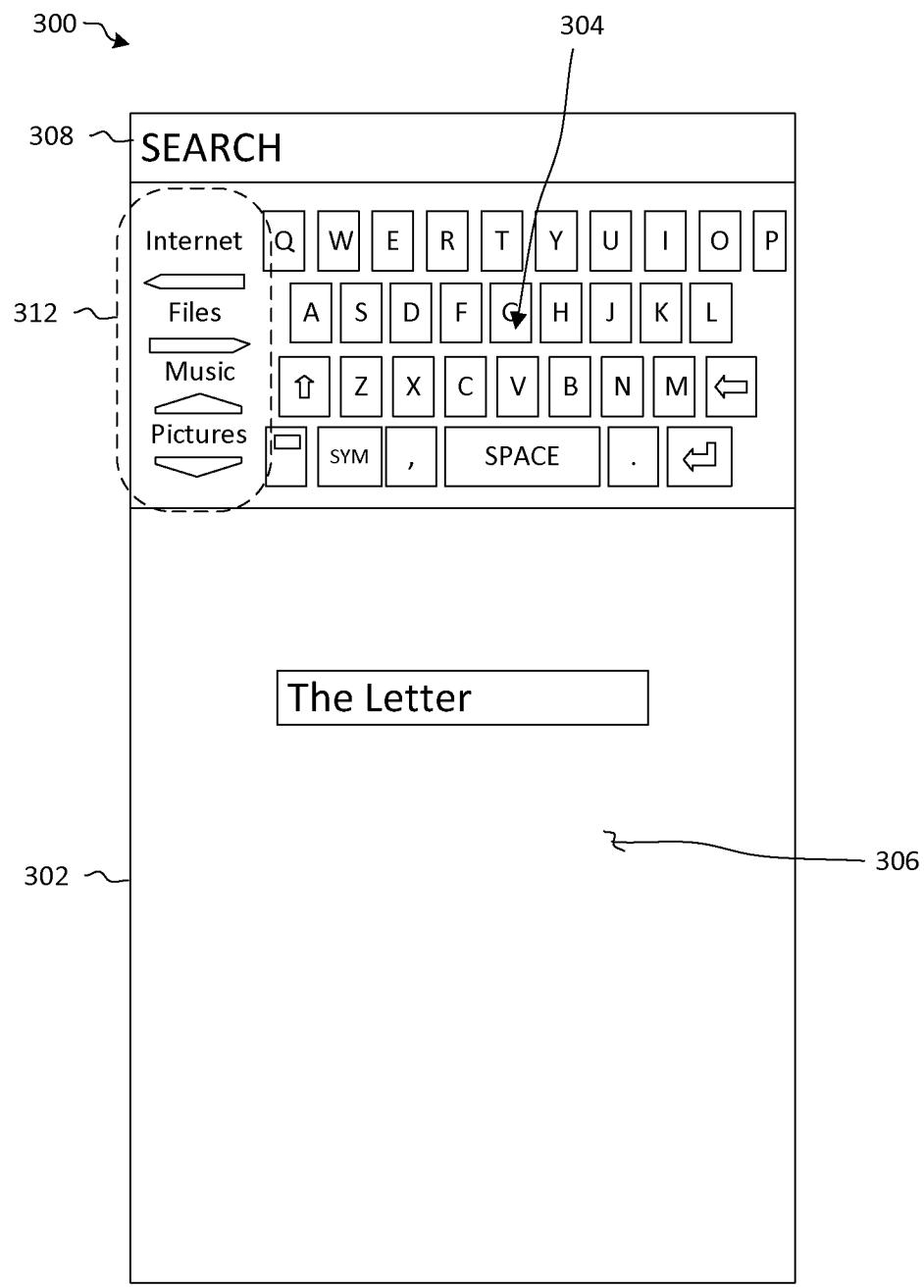
FIG. 21 illustrates a diagram of a display having a virtual keyboard having a virtual keyboard gesture reference area for a search, in accordance with an embodiment.

The gesture reference area 312 may include: a reference for gestures performed on the virtual keyboard to insert punctuation and symbols (FIG. 18), an automated word correction reference for a word that will be inserted if the user hits the space bar (FIG. 19), reference for actions that will be performed when specific gestures are completed (FIG. 20), or reference for actions that will be performed on the specific search term, that was entered in the text box, when a specific gesture is completed (FIG. 21).

The traditional virtual keyboard 332, located towards the bottom of the touchscreen display 302, may have a word prediction bar directly above the virtual keyboard 322. When the word prediction bar displays word prediction or word completion candidates, a user may tap on the word in the horizontal bar to insert the displayed words.

The one handed virtual keyboard 318 may be difficult to reach keys all the way across the virtual keyboard 304 to tap on the words that are placed adjacent to the virtual key grouping 322.

Figure 15:
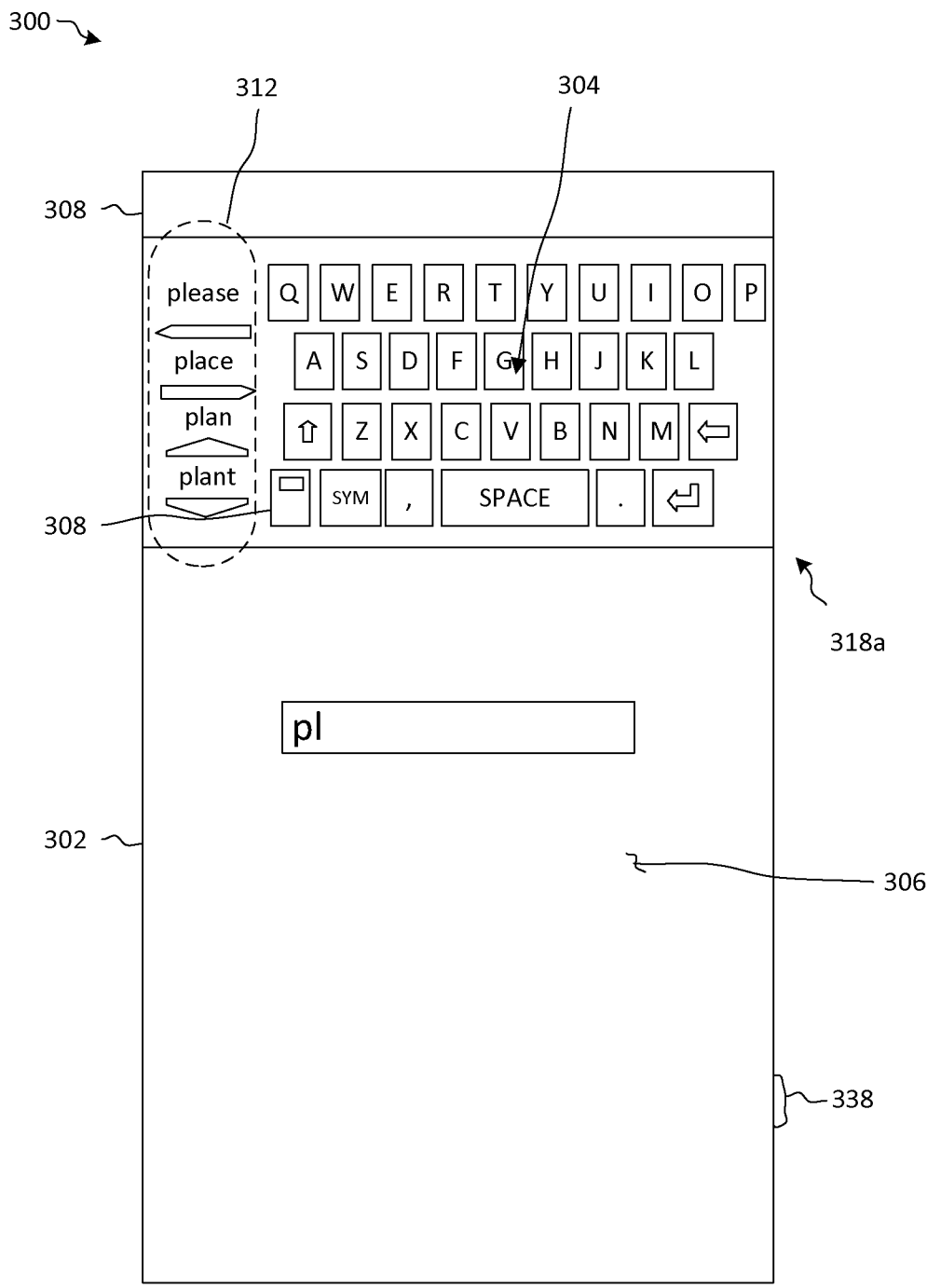
FIGS. 15 and 16 illustrate a diagram of the display of the mobile device of FIG. 13 having a one handed virtual keyboard for right hand use and left hand use, respectively, in accordance with an embodiment.
Figure 16:
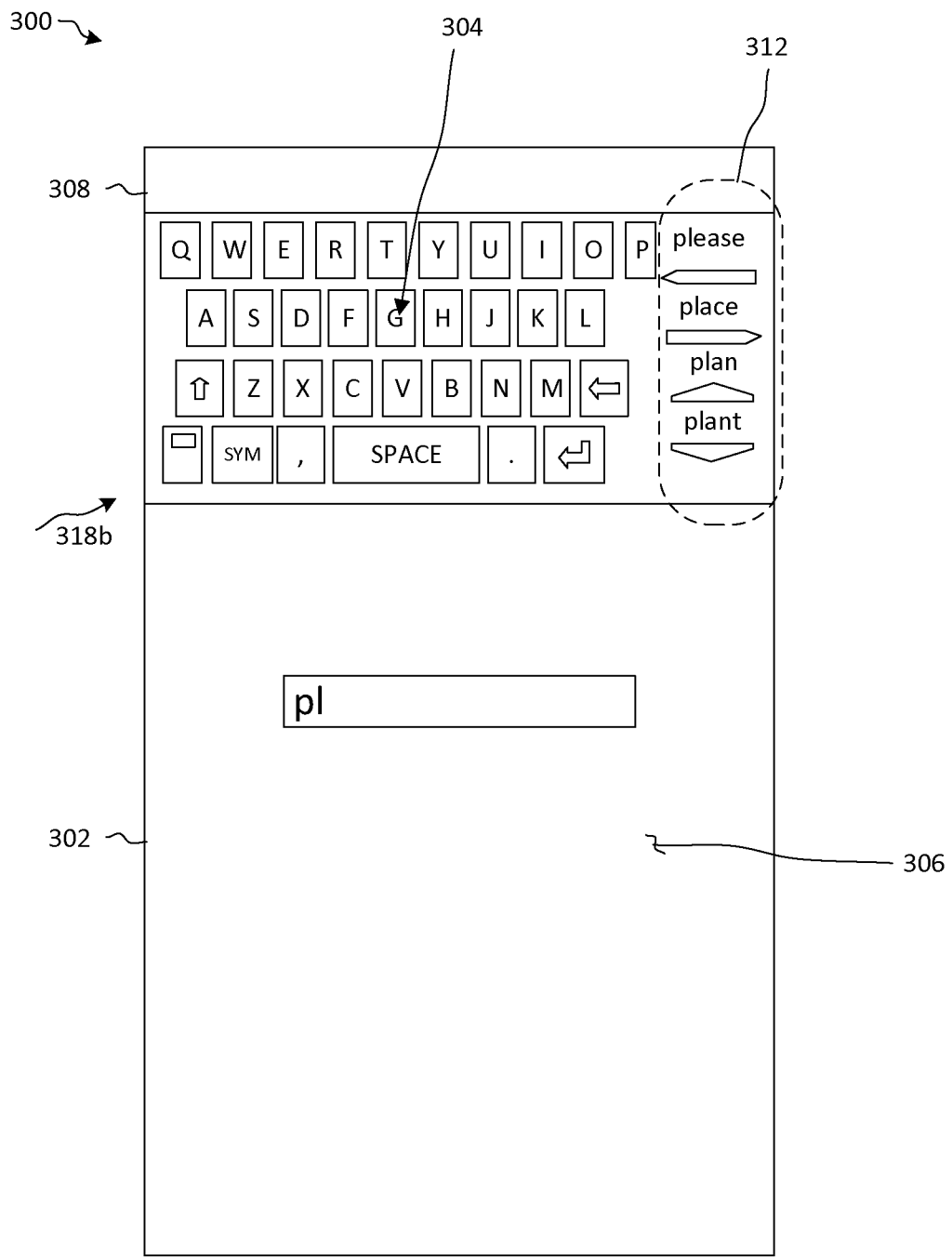
Figure 17:
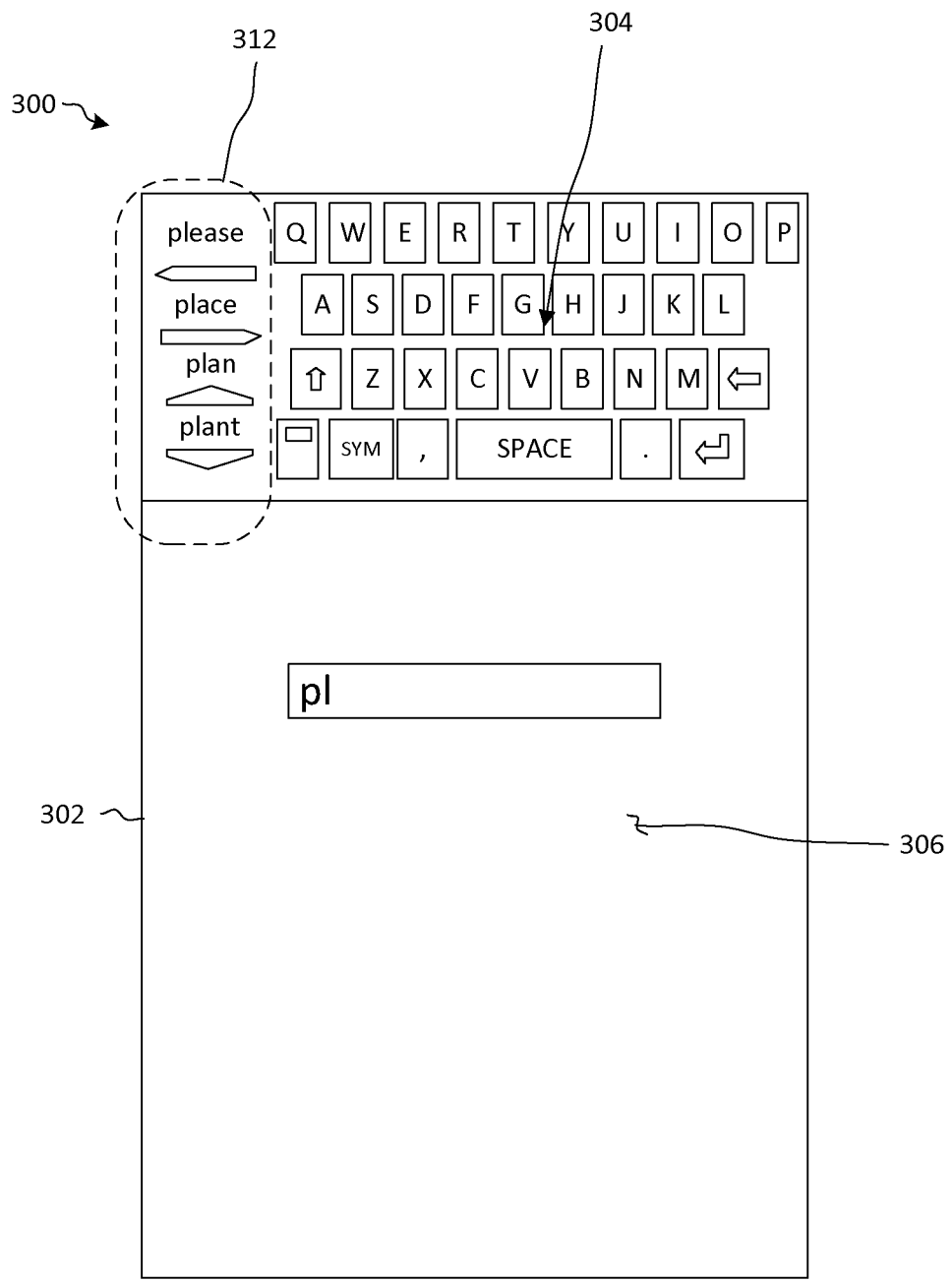
FIG. 17 illustrates a diagram of a display having a virtual keyboard located at the top of the display, in accordance with an embodiment.

As shown in FIGS. 15-17, the virtual keyboard gesture reference area 312 can show four word predictions that are each associated with a gesture direction. The gesture directions include left ←, right →, up ↑, and down ↓. To select the word predictions, the user performs the associated gesture anywhere on the virtual keyboard 304 (or on the touchscreen display 302). This word prediction and word completion is inserted without the user having to reach the thumb outside of the virtual key grouping 322.

Figure 18:
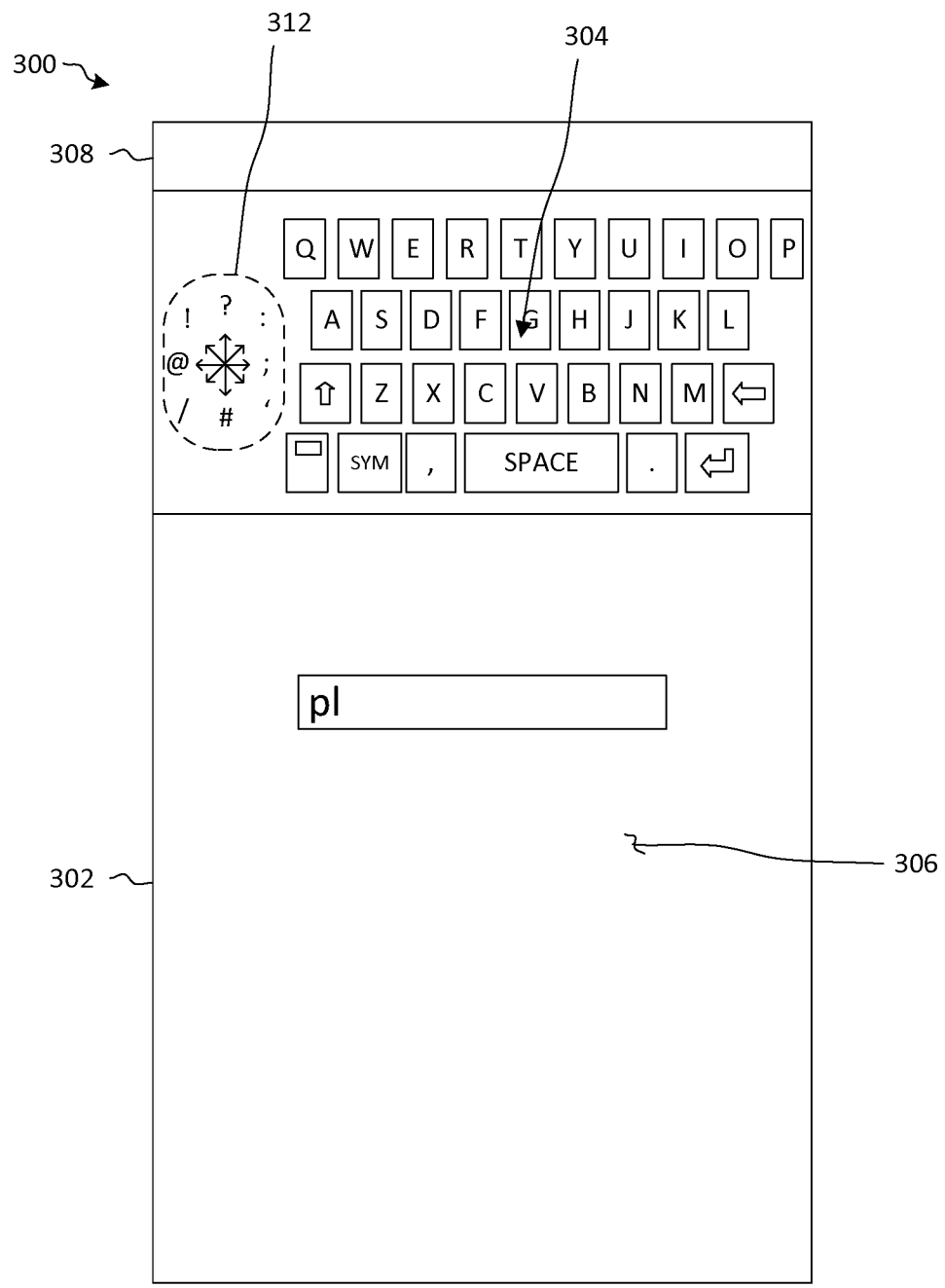
FIG. 18 illustrates a diagram of a display having a virtual keyboard having a virtual keyboard gesture reference area, in accordance with an embodiment.

FIG. 18 illustrates an embodiment of the virtual keyboard gesture reference area 312. The virtual keyboard gesture reference area 312 inserts punctuation and symbols. The virtual keyboard gesture reference area 312 includes a larger number of gesture directions to allow for more prediction options (than shown in FIG. 5) by further including diagonal directions including up-left ⭦, up-right ⭧, down-left ⭩, and down-right ⭨.

Figure 19:
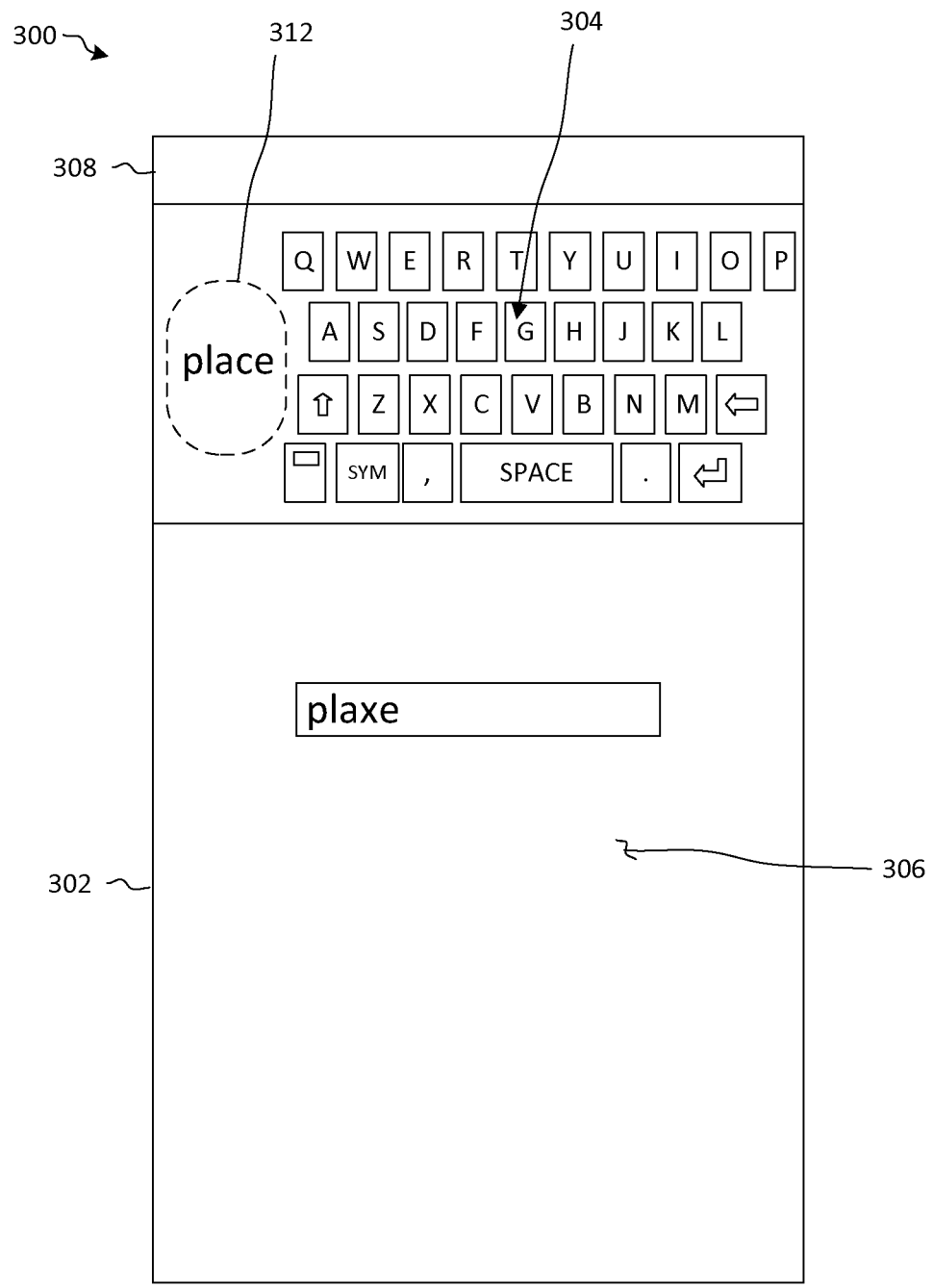
FIG. 19 illustrates a diagram of a display having a virtual keyboard having an automated word correction area, in accordance with an embodiment.

FIG. 19 illustrates an embodiment of the virtual keyboard gesture reference area 312. The virtual keyboard gesture reference area 312 is an auto-correction reference and is not related to a gesture reference. The virtual keyboard gesture reference area 312 provides information to the user that may affect whether they continue or correct an error. In the example shown in FIG. 7, the user has typed 'plaxe' and the system will auto correct it to 'place' if the user continues and hits the virtual space key.

FIG. 20 illustrates an embodiment of the virtual keyboard gesture reference area 312. The input function of the virtual key grouping 356 is related to a phone number and the virtual keyboard gesture reference are 312 relates to actions that can be applied to that phone number (for example call and text). The actions might be shown from the beginning before there are enough numbers to actually perform the action but they may be shown as disabled. This allows the user to understand the function and recognize when the actions change from disabled to operational. This is commonly done by showing the disabled mode in a lower visual contrast than the operational mode.

FIG. 21 illustrates an embodiment of the virtual keyboard gesture reference area 312 having actions that can be performed by using the associated gesture. In the example shown in FIG. 21, a search function is shown in the application title bar or device status bar 308, the inputted text "The Letter" is the entered search term, and the virtual keyboard gesture reference area 312 provides different search contexts.

The one handed virtual keyboard 318 may be located right at the top 320 of the touchscreen display 302 (e.g., as shown in FIG. 17). The one handed virtual keyboard 318 may have an application title bar or device status bar 308 above the virtual keyboard 304 (e.g., as shown in FIG. 13).

In an embodiment, the one handed virtual keyboard 318 is more towards a middle area 342 (FIG. 13) of the touchscreen display 302. The virtual keyboard 304 may divide up the content or application area 306.

In an embodiment, and as shown in FIG. 13, the mobile device 300 may has a diagonal screen size of approximately 134 mm (5.5 inches).

The method may be performed on a mobile device 300. The method includes receiving a triggering event and displaying the virtual keyboard 304 as shown in FIGS. 13-24. The triggering event switches the virtual keyboard 304 from a traditional virtual keyboard 304 (shown in FIG. 14) to the one handed virtual keyboard 318. The switch may be triggered while the virtual keyboard 304 is active or it may be triggered in a situation where the virtual keyboard 304 is not active. For example, a flag may be set in the mobile device software to activate the one handed virtual keyboard 318 configuration when the virtual keyboard 304 is called upon.

As shown in FIG. 14, the traditional virtual keyboard 332 may be located at or near the bottom 340 of the touchscreen display 302. The bottom 340 may be a logical placement when using two hands since it may be easy to hold the device in a secure way. The bottom 340 may not be well suited for typing with one hand where the same hand needs to grip or cradle the mobile device 300 and reach the virtual keyboard 304 on the touchscreen display 302.

The triggering event declares whether the virtual keyboard 304 should be activated in a right hand mode 318a (e.g., FIG. 15) or a left hand mode 318b (e.g., FIG. 16). While the one handed virtual keyboard 318 is activated, the triggering event may also switch the one handed virtual keyboard 318 configuration from the right hand mode 318a to the left hand mode 318b or from the left hand mode 318b to the right hand mode 318a.

The triggering event may also return the one handed virtual keyboard 318 to the traditional virtual keyboard 332 (FIG. 14) or reset the flag in the software so that the virtual keyboard 304 does not activate in the one handed virtual keyboard 318 configuration.

The triggering event may be an automatic trigger or a manual trigger. The automatic trigger may be from a sensor 334 (such as an accelerometer) or set of sensors that recognizes the way the mobile device 300 is being held and may include the device orientation. The manual trigger may be a physical key 338 (e.g., of FIG. 15), deployed mechanism, virtual key, or a menu item in the software. The triggering event may include a combination of the automatic trigger and the manual trigger. The automatic trigger changes the keyboard from the traditional virtual keyboard 332 to the one handed virtual keyboard 318 by automatically detecting the grip position by directly detecting the position of the user's hand 326 or by the user deploying a grip (e.g., second body portion 104) to one side of the mobile device 300.

In an embodiment, the automatic trigger triggers the display of the one handed virtual keyboard 318 and the manual trigger identifies whether the left hand mode 318b or right hand mode 318a should be displayed. The triggering event may use the manual trigger for the one handed virtual keyboard 318 configuration and the automatic trigger to differentiate between left hand mode 318b or right hand mode 318a.

The triggering event switches the virtual keyboard 304 of the mobile device 300 from the traditional virtual keyboard 332 to the virtual keyboard that is optimized for one handed use 318.

As shown in FIG. 14, the virtual keyboard 304 may include at least one virtual key 310 that is used to change virtual keyboard modes. When a user touches the virtual key 310 the virtual keyboard 304 change from its traditional virtual keyboard 332 to its one handed virtual keyboard 318.

As shown in FIG. 15, the one handed virtual keyboard 318 may also have a similar virtual key 310 that changes the one handed virtual keyboard 318 to the traditional virtual keyboard 332.

In addition, the one handed virtual keyboard 318 may have a virtual key 310 to switch the one handed mode from right 318a to left handed 318b mode or left 318b to right handed 318a mode. The traditional virtual keyboard 332 may have two virtual keys 310 that are associated with changing the virtual keyboard 304 from the traditional virtual keyboard 332 to the one handed virtual keyboard 318 configuration. The two virtual keys 310 may be associated with different actions. For example, the virtual key 310 located on the right side of the traditional virtual keyboard 332 may change the mode to a right hand mode 318a while a virtual key 310 on the left side of the traditional virtual keyboard 332 may change the mode to the left hand mode 318b.

The manual trigger to the traditional virtual keyboard 332 may be well placed in regard to the way the user is holding the mobile device 300 where the user is already using one hand that the virtual keyboard needs to be switched to.

In an embodiment, the virtual keys 310 are floating and are ergonomically placed for a logical grip position. The floating virtual keys 310 may be located in a content or application area 306 and the floating virtual keys 310 may only be available for a short period of time when the traditional virtual keyboard 332 is activated. It may not be desirable to have the floating virtual keys 310 constantly displayed where the floating virtual keys 310 obscure parts of the content or application area 306.

In an embodiment, the display includes two of floating virtual keys 310 including a left virtual key 310 on the left of the mobile device 300 associated with the left hand mode 318 and a right virtual key 310 on the right of the mobile device 300 that would be associated with the right hand mode 318a. Alternatively, a gesture on the touchscreen display 302 or specifically on the virtual keyboard 304 is the triggering event to switch to the one handed virtual keyboard 318. Different gestures could be used to trigger the left hand mode 318b and the right hand mode 318a (e.g., swipe left, swipe right).

An alternate manual trigger may be activated by a manual trigger button 338 on the front, back, or side of the mobile device 300. The manual trigger button 338 may be a tactile switch, a touch sensitive switch, or a pressure sensitive switch. The manual trigger button 338 may cycle between the different virtual keyboard modes 318a, 318b and other modes could be accessed from the same button such as a voice input mode. The manual trigger button 338 may have other functions as well. For example, when the virtual keyboard 304 is not present, the manual trigger button 338 triggers a universal search function. The manual trigger button 338, when subject to a long press, may lock the touchscreen 302.

The mobile device 300 may include two manual trigger buttons 338. The two manual trigger buttons 338 may improve ergonomic positioning and access. The first manual trigger button 338 triggers the right hand mode 318a and a second manual trigger button 338 triggers the left hand mode 318b. Hitting the manual trigger button 338 again would return to the traditional virtual keyboard 332 or cycle through other input modes.

The manual trigger button 338 may be a sensor or a slide switch mounted on the back of the device so that the user could gesture or move the manual trigger button 338 to the side of the mobile device 300 that the user wants to use one handed.

The mobile device 300 may have an asymmetric design to provide a better grip or ergonomics for either the left or right hand. The mobile device 300 may have the grip area 120 and other features as described with reference to FIGS. 1-12.

The triggering event may go from the traditional virtual keyboard 332 to the one handed virtual keyboard 318 that is aligned to the physical configuration of the grip (e.g. grip area 120). The virtual keyboard 304 may be setup to default to a certain one handed orientation (318a or 318b) over the other or the mobile device 100 may be rotated through 180 degrees normal to the touchscreen display 302 to deploy the grip on the alternate side and have the one handed virtual keyboard 318 configured for the opposite side. This type of system might be viewed as the manual trigger to go from the traditional virtual keyboard 332 to the one handed virtual keyboard 318 configuration and an automatic orientation sensor using a built in accelerometer to choose the desired orientation and the one handed virtual keyboard 318 configuration.

Where the mobile device 300 automatically detects the grip the user is using, the system automatically checks to see if the mobile device can determine the grip when the virtual keyboard 304 is invoked. The mobile device 300 may include a sensor or a series of sensors to determine the user's grip. The system may invoke the appropriate virtual keyboard (traditional virtual keyboard 332, left hand one handed 318b, right hand one handed 318a). The sensor system may be capacitive, proximity, or pressure or a combination of sensors that could also include other types of sensors. The sensor system could be used for other functions beyond the virtual keyboard 304. For example, the sensor system may periodically check the user's grip. If the sensor system cannot determine the type of grip accurately, the virtual keyboard 304 reverts to the default keyboard. The default keyboard may be set to the traditional virtual keyboard 332. There may be a setting in the software of the mobile device 300 that allows the user to choose a default virtual keyboard that is different from the traditional virtual keyboard 332.

Where the mobile device 300 is configured with a deployable grip (for example, the mobile devices 100, 200 described with reference to FIGS. 1-12), the system may default to the virtual keyboard 304 that is logically associated with the configuration. The deployable grip may have the ability to deploy to create either a grip on the left or the right or it may just deploy to one side and achieve the opposite grip by rotating through 180 degrees normal to the screen. The mobile device 300 includes the sensor or combination of sensors to sense if the grip has been deployed and in what direction or orientation. In an embodiment, the user has the grip deployed for security of grip and has the traditional virtual keyboard 332. In this situation the user may change the default virtual keyboard mode or change the setting for default virtual keyboard mode.

In an embodiment, the virtual keyboard 304 used for one handed use is located at or near the top 320 of the touchscreen display 302 (e.g. FIG. 17). The top 320 placement may allow the user to cradle or grip the mobile device 300 more securely and more comfortably reach the virtual keyboard 304 with the user's thumb. The user's fingers are able to comfortably get under the center of gravity of the mobile device 300 when the touchscreen display 302 is facing straight up or at a reasonable comfortable angle where the user might be looking at the touchscreen display 302 at an angle of approximately 45 degrees down from a horizontal view. The user's hand and arm may be in a comfortable position to use the mobile device 300 while the user is standing or walking. When holding the mobile device 300 this way the thumb naturally falls toward the top area 320 of the touchscreen 302 and partially toward the side 324 of the touchscreen display 302 that corresponds to the hand being used 326.

Figure 22:
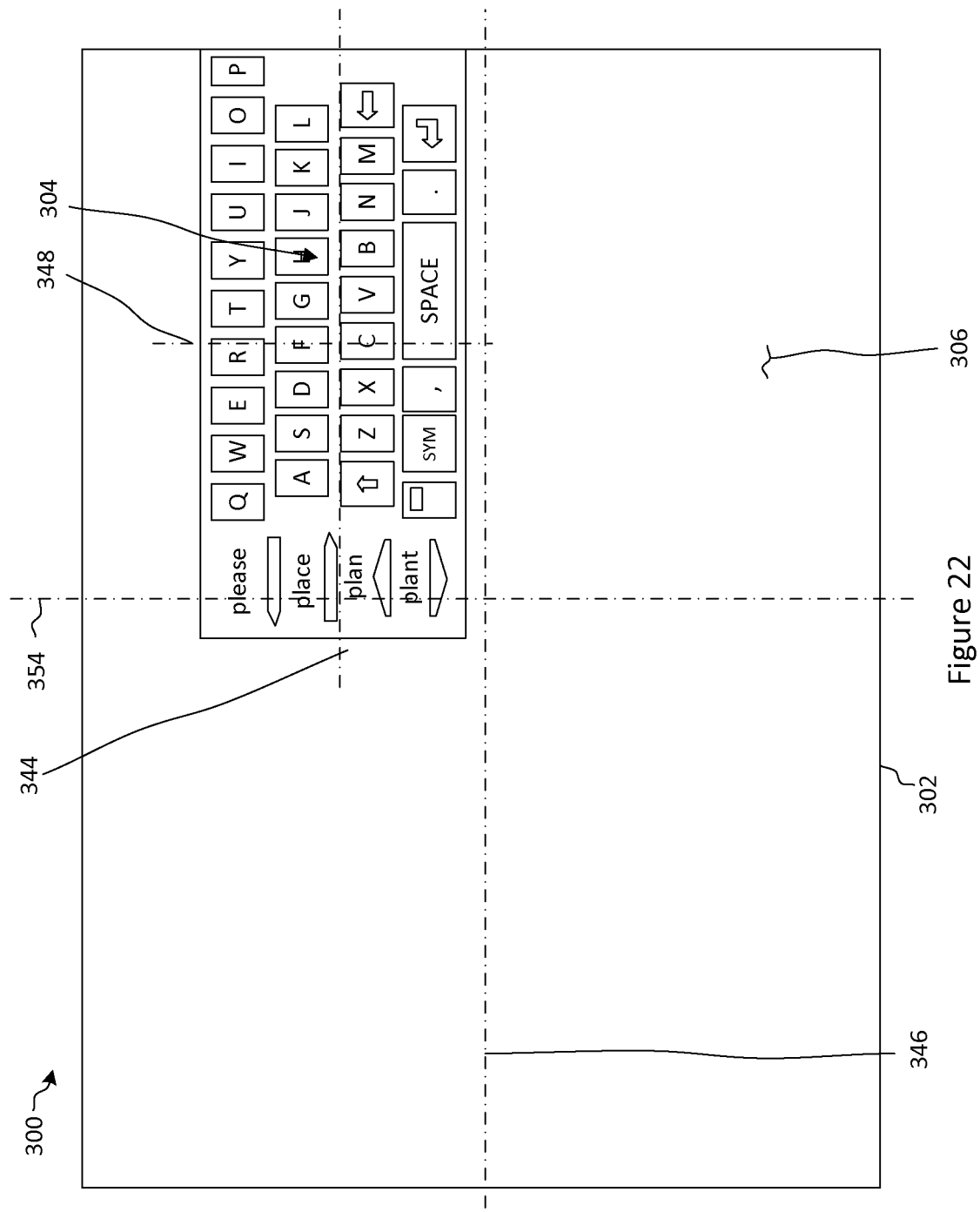
FIGS. 22 and 23 illustrate a diagram of a tablet display having a virtual keyboard for right hand use and left hand use, respectively, in accordance with an embodiment.
Figure 23:
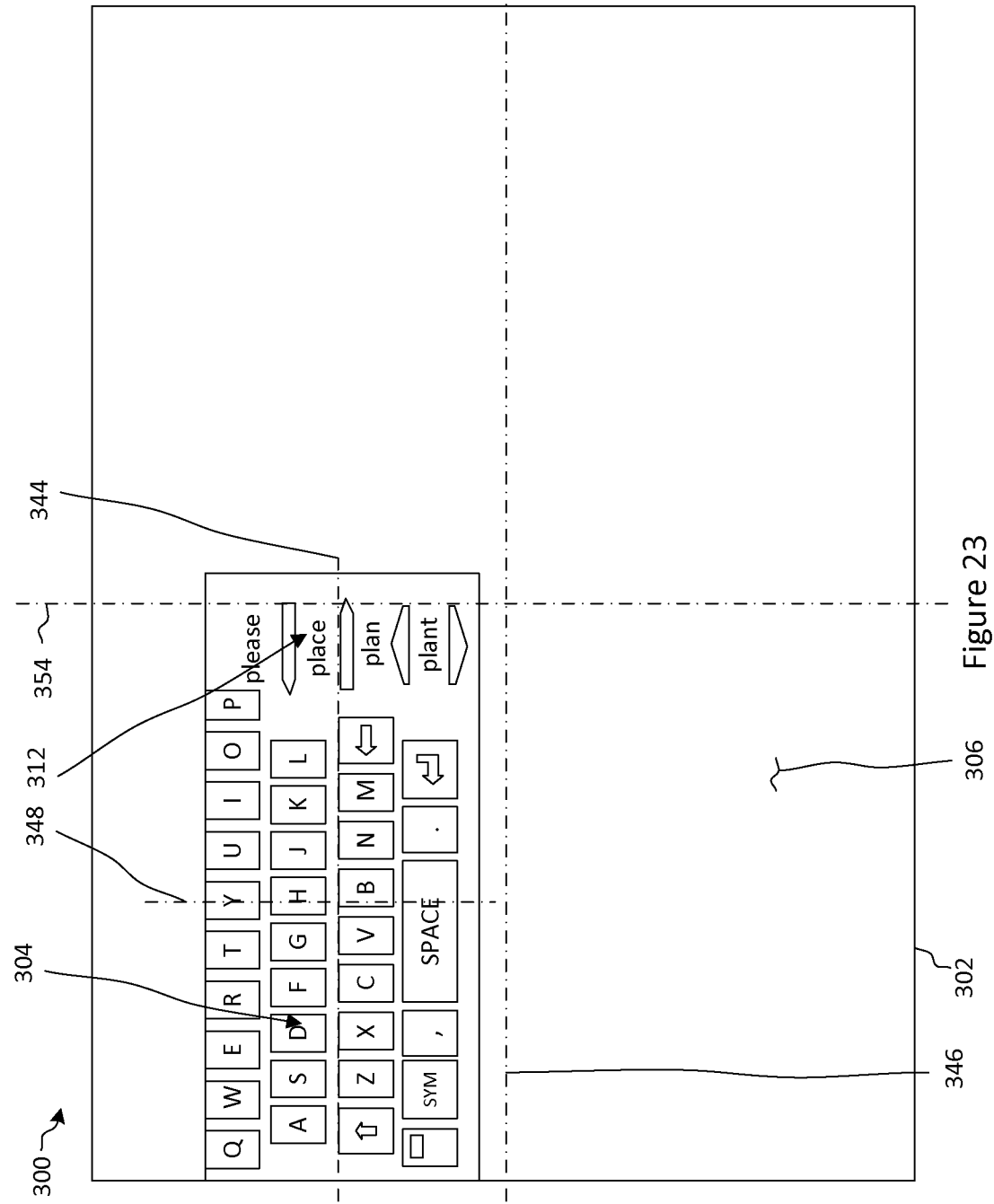

FIGS. 22 and 23 illustrate the active area of a tablet sized touchscreen of a tablet 300 in landscape orientation. For example, the touchscreen display 302 width in the orientation of use may exceed 90 mm (3.5 inches). In this embodiment, the one handed virtual keyboard 318 does not extend the full width of the touchscreen display 302. With larger tablets or with tablets in a landscape orientation, the one handed virtual keyboard 318 may not extend to half the width of the touchscreen display 302. FIG. 22 shows the right hand use 318a. FIG. 23 shows the left hand use 318b. The virtual keyboard 318 and virtual keyboard gesture area 312 overlay the application content area.

Certain applications or content may not be able to be properly laid out around the one handed virtual keyboard 318 and it might be desirable to have the one handed virtual keyboard 318 overlay the content or application area 306 to make best use of the screen size for displaying content. The configuration where the one handed virtual keyboard 318 overlays the content or application area 306, the one handed virtual keyboard 318 may be overlaid in a manner with some transparency so there is some partial recognition of the content that is placed where the one handed virtual keyboard 318 is located. Where the one handed virtual keyboard 318 overlays the content or application area 306, the one handed virtual keyboard 318 may not be located right at the top 320 of the screen or just below the application title or device status bar 308.

The one handed virtual keyboard 318 may be placed lower down the side of the touchscreen display 302 and have a horizontal centerline 344 of the one handed virtual keyboard 346 above a horizontal centerline of the touchscreen display 302 such that some content or application area 306 is located above the one handed virtual keyboard 318.

The traditional virtual keyboard 332 has its virtual key grouping predominantly centered across the touchscreen display 302 of the mobile device 300. This allows the target area of the virtual keyboard 304 to be large which may help with accuracy when using two hands but may not be optimum with one handed typing when the user has to strain or reposition the grip to reach the target keys of the virtual keyboard 304.

For the one handed virtual keyboard 318, the virtual keyboard 304 may be located closer to the side 324 of the mobile device 300 that is related to the hand 326 operating the mobile device 300. When the one handed virtual keyboard 318 is configured to be used with the right hand, a vertical centerline 348 of the virtual keyboard 304 is to the right side of a vertical centerline 354 of the touchscreen display 302. Similarly, when the one handed virtual keyboard 318 is configured to be used with the left hand the vertical centerline 348 of the virtual keyboard 304 is to the left side of the vertical centerline 354 of the touchscreen display 302.

The virtual keyboard 304 may be a QWERTY configuration, a QWERTZ configuration, an AZERTY configuration, or an alphabetic configuration. The virtual keyboard 304 may be a specialized key grouping of symbols or numbers. The virtual keyboard 304 may be context specific entry fields such as url entry, email address entry or input in other languages. FIG. 20 illustrates a specialized virtual keyboard 356 for phone number entry.

Figure 24:
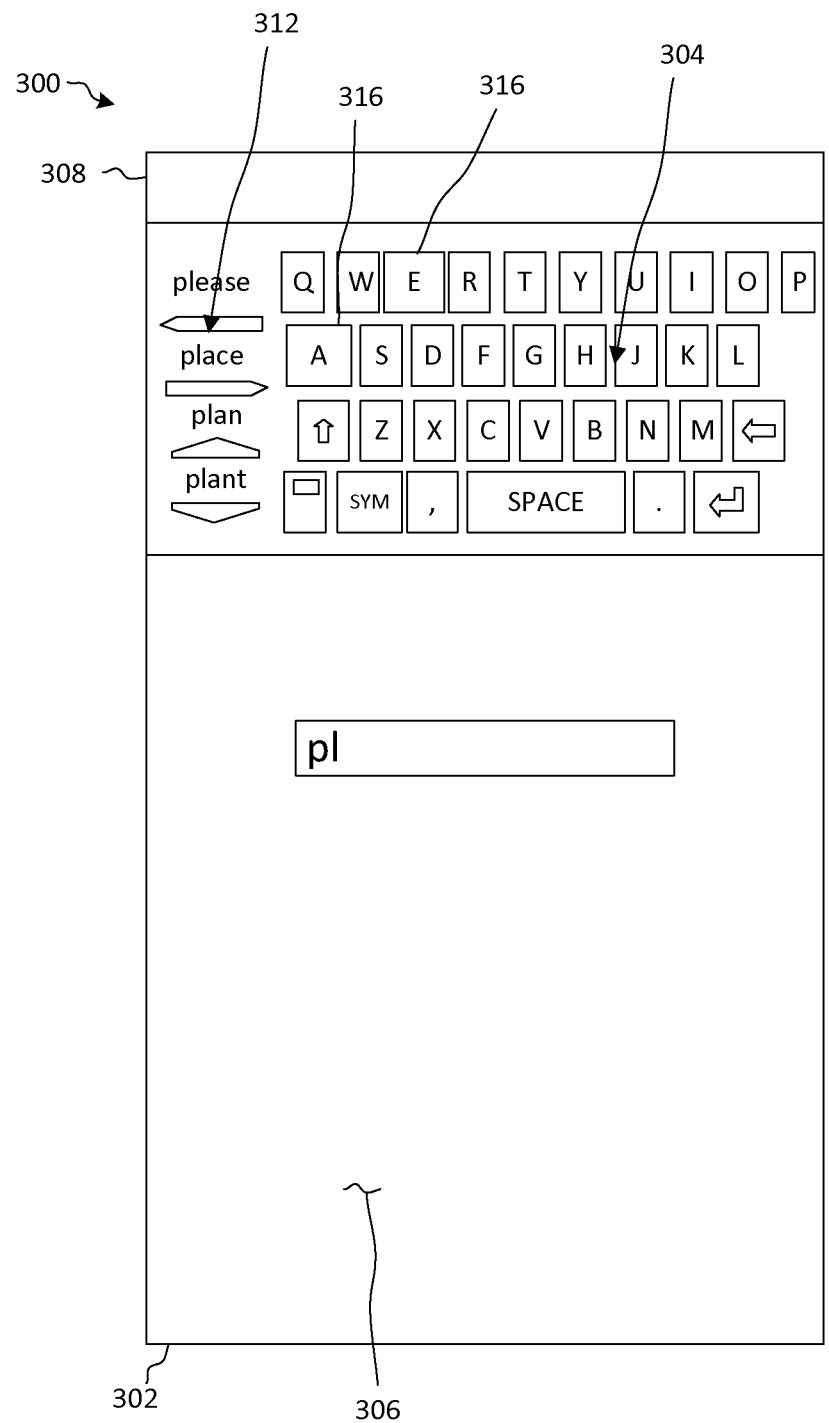
FIG. 24 illustrates a diagram of a display having a virtual keyboard with enlarged virtual keys, in accordance with an embodiment.

FIG. 24 illustrates the virtual keyboard 304 having enlarged virtual keys 316 that are enlarged from their default size. The processor of the mobile device 300 includes a prediction engine that determines what keys will be most likely targeted next by a user. The determined keys are then displayed as enlarged virtual keys 316.

In the example shown in FIG. 24, the letters 'pl' have been typed and the keys labelled 'E' and 'A' are determined to be likely candidates by a prediction engine in the software. A certain number of letters (e.g., 2 or 3) are enlarged on the virtual keyboard 304 with the default size of the neighboring keys are not changed. The virtual keyboard 304 may expand as necessary away from the hand 326 being used.

The enlarged virtual keys 316 may enhance typing accuracy by providing larger targets to keys that are statistically more likely to be selected without growing the virtual keyboard 304 to a size that makes it difficult to use with one hand. This is in contrast to the traditional virtual keyboard 332 that may have its keys maximized in size to span the width of the mobile device 300. As such, the traditional virtual keyboard 332 may not enlarge individual key targets without at the same time minimizing the targets of some of the other virtual keys.

The enlarged virtual keys 316 grow dynamically in the one handed virtual keyboard 318 to provide the area in the one handed virtual keyboard 318 dedicated for the virtual keyboard 304 gesture area or the virtual keyboard gesture reference area 312 may change dynamically. The software for the virtual keyboard 304 settings may allow the size of the virtual keyboard 304 to be adjusted with preset settings or by an interactive setup where the software asks the user to hold the mobile device 300 in one hand 326 and to reach across and touch the touchscreen display 302 comfortably with the thumb. This touch point may create a parameter for determining the optimum size for a particular user and grip style.

The virtual key grouping 322 is offset to the side of the mobile device 300 to create available space adjacent to the virtual key grouping 322 but on the opposite side 328 of the hand 326 operating the mobile device 300. The opposite side area may be harder to reach with the thumb when using the mobile device 300 with one hand but is visually associated with the virtual keyboard 304 and may be easy to see while keeping all of the virtual keyboard 304 in view.

As an example of how the mobile device 300 may be used, the user is composing an email message on the touchscreen display 302 of the mobile device 300. The user begins while waiting for a coffee at the coffee shop and is typing using both thumbs with the traditional virtual keyboard 332 while cradling the mobile device 300 using both hands. Once the coffee is ready, the user prepares to leave to walk to work. The user taps the virtual key 310 on the virtual keyboard 304 that is associated with triggering a mode switch between the traditional virtual keyboard 332 and the one handed virtual keyboard 318. The virtual keyboard 304 on the touchscreen display 302 changes from the traditional virtual keyboard 332 at the bottom 340 of the touchscreen display 302 to the right hand mode 318a at the top 320 of the touchscreen display 302. The email compose view moves down on the touchscreen display 302 to accommodate the change in the virtual keyboard 304. The user then repositions their grip so the mobile device 300 rests in the right hand 326. The user picks up the coffee with the free hand (left hand) and starts walking. Because of the position of the one handed virtual keyboard 318 the user can tap letters on the virtual keyboard 304 and perform swipe gestures in the virtual keyboard gesture reference area 312 over the one handed virtual keyboard 318 to continue composing the email. Once the email is complete, the user pushes the send key located in the application area 306 and puts the mobile device 300 away in his pocket.

Referring now to FIGS. 25-33, a mobile device and method for having an offset display is described.

Figure 25:
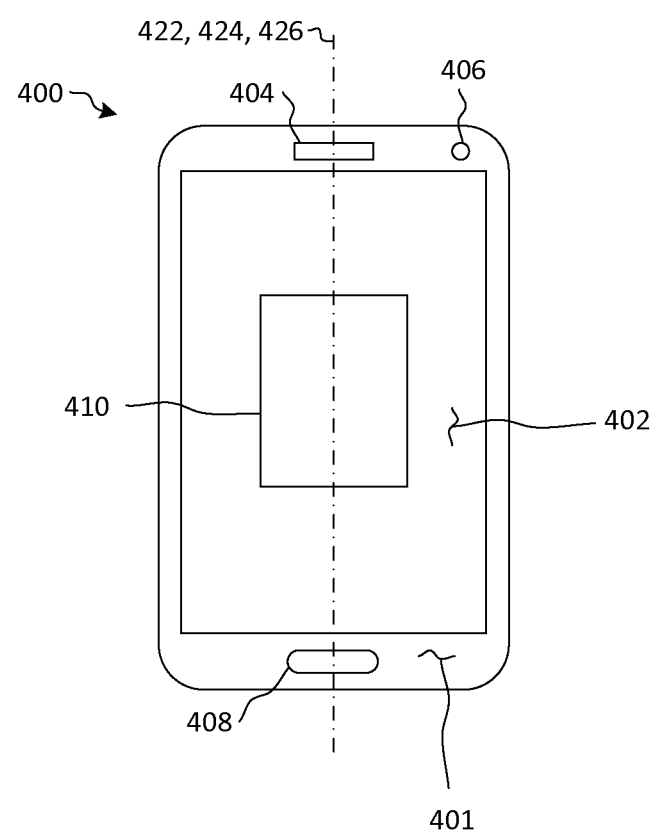
FIG. 25 illustrates a diagram of a front view of a conventional mobile device.

FIG. 25 illustrates a traditional mobile device 400 having a touchscreen 402. The traditional mobile device 400 includes a device centerline 422. The touchscreen 402 is in portrait orientation and is centered in a horizontal direction about a screen centerline 424. The screen centerline 424 and the device centerline 422 are at the same position on the traditional mobile device 400. In the traditional mobile device 400, displayed software components 410 (e.g. what is displayed on the touchscreen 402) have a display centerline 426 that is the same as the screen centerline 424 such that the displayed software components 410 are centered horizontally on the touchscreen 402 and centered horizontally on the traditional mobile device 400.

The traditional mobile device 400 includes device components exposed on the front surface 401 located above and below the touchscreen 402. Device components may include any one or more of an earpiece speaker 404, a front facing camera 406, a proximity sensor, a home button 408, antenna elements, and clearance. The antenna elements and clearance may not be visible on the front surface 401 and may be located in a manner where they are effectively exposed to the front surface 401 while not fully located behind the touchscreen in order to provide desired performance.

Components of the traditional mobile device 400 are commonly located above and below the touchscreen 402. The front surface 401 is defined as the same surface that the primary touchscreen 402 is on. This may be a logical configuration for mobile devices 400 where the screen is relatively small. However, if the screen height and the device configuration make the mobile device height larger than 135 mm (5.3 inches) the mobile device height can be undesirable for a user to comfortably carry in a pocket.

FIGS. 26-33 illustrate a mobile device 500 having a touchscreen 502. The mobile device 500 includes device components 503 (such as an earpiece speaker port 504, a front facing camera 506, and a home button 508) that are exposed to a front surface 501 of the mobile device 500 and that are located along the same edge 505 of the mobile device 500. The mobile device 500 components exposed to the front surface 501 are located fully along one side 505, either the left (e.g., at FIGS. 26, 27, and 29-33) or the right (e.g., at FIG. 28) of the portrait touchscreen. Structural components that make up the housing and components that are small enough to have minimal impact on the front surface 501 area, as well as the touchscreen 502 are excluded from these mobile device components 503 that are exposed to the front surface 501 along one edge.

The mobile device 500 may allow for the large portrait touchscreen 502 in a configuration where the height 536 of the device is kept to a minimal size relative to the screen height 538, taking into consideration added height that is provided for the structure and the need for some extra space for small components and some consideration for clearance for antenna performance. Components that are exposed to the front surface 501 may include any one or more of the earpiece speaker 504, the front facing camera 506, a proximity sensor, a home button 508, antenna elements, and a clearance space. The antenna elements and clearance space may not be visible from the front surface 501 but they may be located in a manner where they are effectively exposed to the front surface 501 and are not fully located behind the touchscreen in order to improve performance.

Figure 32:
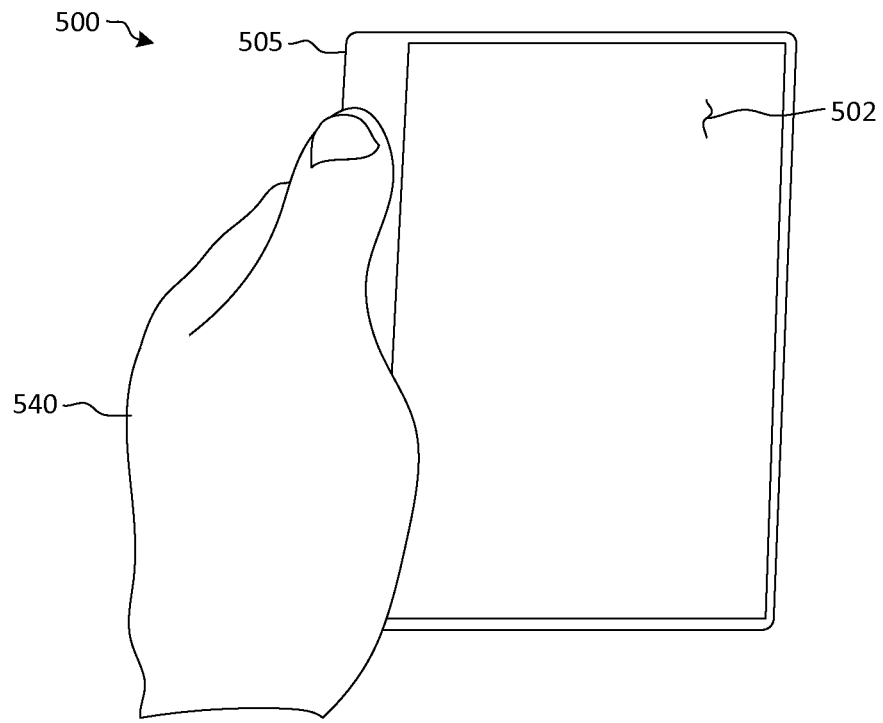
FIG. 32 illustrates the mobile device of FIG. 26 in use.

The implication of locating these components 503 along one vertical edge 505 of the portrait touchscreen 502 is that the horizontal positioning of the portrait touchscreen 502 will not be centered horizontally in the mobile device 500. The wider vertical edge 505 may be located on the right side or left side of the device. The wider edge 505 may also provide a preferable grip for the user where the thumb 540 that is holding the device can rest comfortably on this wider edge 505 without accidentally touching the touchscreen 502, as shown in FIG. 32.

For example, a wider edge 505 can be used in ereader and tablet for comfort while holding at the expense of device size. By providing only one wide edge 505 in the configuration to allow for the placement for components the mobile device 500 achieve an efficiency by having a large screen 502 but maintaining a manageable front surface 501 and provide a comfortable gripping surface for the user.

In an embodiment, the mobile device 500 includes sensors (as described above) that sense the grip or the device orientation. The sensors may provide the user to employ the wider edge as a grip in either the left or right hand the device may allow for rotation through 180 degrees normal to the touchscreen 502 where the software will reorient correctly based on sensors. As well the device may allow for reorientation in a landscape screen configuration. Some of the usability of the device components are sensitive to device orientation.

Figure 26:
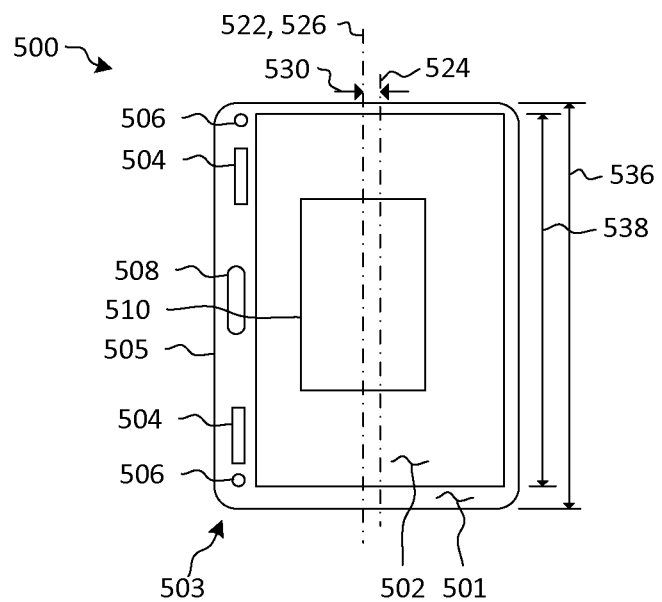
FIG. 26 illustrates a mobile device having a touchscreen offset to the right of the centerline of the mobile device and having two earpiece speakers and two front facing cameras, in accordance with an embodiment.

The mobile device 500 includes a device centerline 522 that passes through the geometric center of the front surface 501 of the mobile device 500 as illustrated at FIG. 26. For example the device centerline 522 is positioned such that there is equal surface area on both sides of the mobile device 500.

The touchscreen 502 includes a screen centerline 524. The screen centerline 524 is offset from the device centerline 522. The screen centerline 524 may be offset from the device centerline 522 based on the area on the front surface 501 provided for the device components 503. For example, the screen centerline 524 may be offset from the device centerline 522 by one half of the difference between the widths of either side of the touchscreen 502 on the front surface 501. The mobile device 500 includes software components 510 that have a display centerline 526.

A compensating offset 530 is applied to the software components 510 to center the software components 510 horizontally on the mobile device 500. The compensating offset 530 is the distance from the device centerline 522 to the screen centerline 524. In contrast to the traditional mobile device 400, the compensating offset does not exist because the device centerline 422 and the screen centerline 424 are the same.

Ergonomically, being centered horizontally on the mobile device 500 may outweigh possible disadvantages of the software components 510 having to be smaller than a width 528 of the touchscreen 502. Some software components 510 may have more logic or a physical ergonomic advantage by being centered horizontally within the mobile device 500 even though the touchscreen 502 may not be centered horizontally on the mobile device 500. The software components 510 may include a virtual keyboard 514, a device button bar, and a device's home screen.

Figure 28:
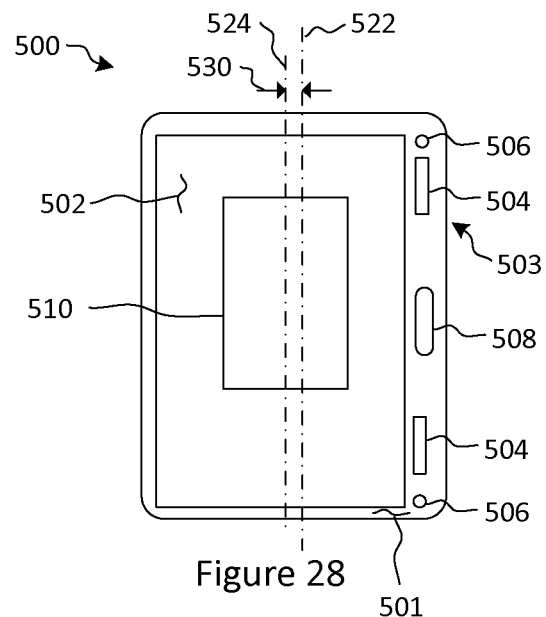
FIG. 28 illustrates a mobile device having a touchscreen offset to the left of the centerline of the mobile device, in accordance with an embodiment.
Figure 29:
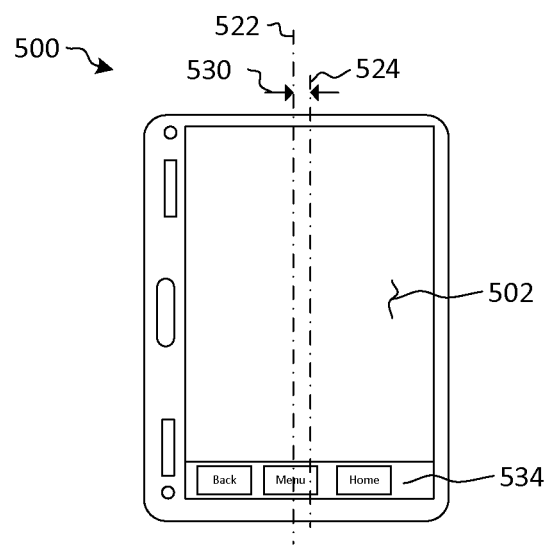
FIG. 29 illustrates the mobile device of FIG. 26 having a virtual device button bar.

FIG. 26 illustrates the mobile device 500 having two earpiece speakers 504, two front facing cameras 506, and one home button 508. The mobile device 500 may be used with the touchscreen offset 530 to the right or rotated 180 degrees normal to the touchscreen 502 where the touchscreen offset 530 is on the left. FIG. 28 illustrates the mobile device with the touchscreen offset 530 to the left.

Figure 27:
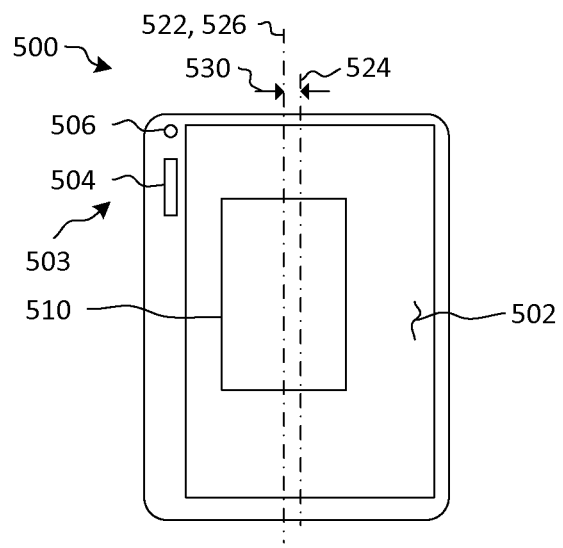
FIG. 27 illustrates a mobile device having a touchscreen offset to the right of the centerline of the mobile device, with one earpiece speaker and one front facing camera, in accordance with an embodiment.

FIG. 27 illustrates the mobile device 500 having one earpiece speaker 504 and one front facing camera 506. The touchscreen offset 530 is to the right in the given orientation.

In a further embodiment, the mobile device includes components that are duplicated at the top and bottom of this wider component edge (e.g. FIGS. 26 and 28). The appropriate component may be used depending on the orientation of the mobile device. The duplication of components may include any one or more of the earpiece speaker 504, front facing camera 506, proximity sensor, and microphones are components.

In an embodiment, the duplicate components may provide new functionality by being active at the same time and the original components. For example, multiple microphones as may be known, may provide more situational awareness and improve the audio quality. Dual earpiece speakers 504 may operate as stereo speakers when playing media, and this is a logical configuration while watching media when the screen is in a landscape configuration. Dual cameras 506 may be used to capture 3D images or may be used to track motion. For example, a security feature may could use both cameras 506 to add 3D depth data to a face recognition access system.

Other components may be positioned so that they are on or close to the vertical center so as to provide the same ergonomic experience in either the left or right hand grip configuration such as the home key or screen lock key 508. As well a key cluster such as volume keys may be close or at the vertical center where the role of the individual keys may change depending on orientation.

Repeated components, components near or on the vertical center or component clusters at or near the vertical center may not be exposed to the front surface 501 while providing functionality in different orientations. Microphones and volume key clusters may be located on the sides of the mobile device 500.

Where the mobile device 500 is being used in a traditional manner, one of the repeated components is operable to be used, or the two components play a different role, the sensors that sense the grip position or the orientation of the mobile device may determine which components are to be active. The sensor may be an accelerometer to determine device orientation.

Figure 30:
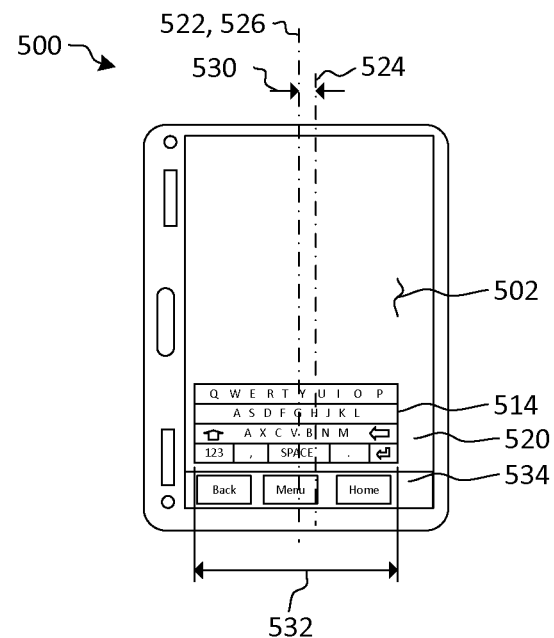
FIG. 30 illustrates the mobile device of FIG. 26 having a virtual keyboard.
Figure 31:
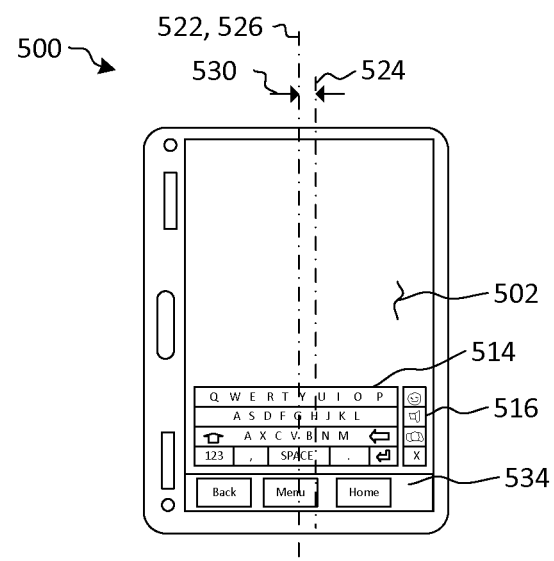
FIG. 31 illustrates the mobile device of FIG. 26 having an additional keys.

As shown in FIGS. 30 and 31, the software components 510 include the virtual keyboard 514. Where the virtual keyboard 514 is below a certain screen size, the width 532 of the keyboard includes a tradeoff to have the virtual keyboard 514 centered in the mobile device 500. Where the virtual keyboard 514 is above a certain size, the key targets are of a reasonable size. For example, where the width 532 of the virtual keyboard 514 is more than 55 mm (2.2 inches) and the compensating offset 530 is applied, then implementation of the compensating offset 530 may provide an improved user experience.

Where there is extra space created by the compensating offset 530, the virtual keyboard 514 may include added keys 516 (FIG. 31) to fill the extra space. For example, the display centerline 526 of the virtual keyboard 514 passes between the center of T key and the center of the Y key. Different virtual keyboards 514 may have the display centerline 526 travel through the center of the G key or between the center of the G key and the center of the H key. In an embodiment, the display centerline 526 also passes through the center of the spacebar. Alternatively, the virtual keyboard 514 may have a slight offset to the spacebar.

Having the virtual keyboard 514 layout centered horizontally in the mobile device 500 may provide an ergonomic advantage. For example, where the virtual keyboard 514 is centered horizontally, a common typing grip is provided where the user cradles the mobile device 500 in their hands and uses both thumbs to type. This allows the user's mental model and experience to be leveraged by providing a familiar left hand, right hand split of the letters with which the user may be familiar from a full size computer keyboard, from experience on other small QWERTY keyboards, and from other virtual keyboard devices. The virtual keyboard 514 does not reach all the way to the screen border on the narrow screen to device edge can also help the ergonomics if the user uses only one hand to grip the device and to use the virtual keyboard 514. The extra space created by the compensating offset 530 can be used for added keys 516 such as different controls or reference elements. The added keys 516 may include alternate input controls or other virtual keyboard inputs such as symbols, punctuation, or language controls.

Figure 33:
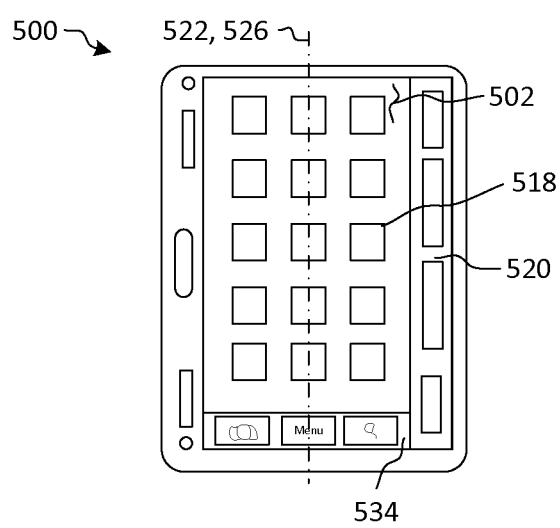
FIG. 33 illustrates the mobile device of FIG. 26 having an application icon grid and a status area.

Other examples of software components 510 include a virtual device button bar 534 (shown in FIGS. 29 and 33) and an application icon grid 518 (shown in FIG. 33). The virtual device button bar 534 and the application icon grid 518 may be less constrained and less tied to a user's previous experience and mental model than the virtual keyboard 514 but may provide an ergonomic reach advantage by not having these components pushed out to the screen border on the narrow screen to device edge. Extra space created by the compensating offset 530 may be used for less commonly used functions or for status reference items like battery level, signal strength, current time.

As an example of the mobile device 500 in use, the user is holds the mobile device 500 in the left hand with the left thumb comfortably placed on the wide left vertical edge 505 (e.g., as is shown in FIG. 32). The user then operates the touchscreen 502 controls using the index finger on the right hand. The user reads some messages and then decides to respond to one. The user repositions the grip to hold the mobile device 500 with two hands and uses the thumbs to type. The virtual keyboard comes up on the touchscreen and is in the layout as shown in FIG. 30 with a compensating offset. The user types out a reply comfortably using both thumbs and sends the message. The user then receives a phone call and answers it. Based on the orientation of the device the upper ear piece speaker 504 is activated and the lower microphone is activated. The user repositions the grip so that the user is holding the device from the sides and places the upper earpiece speaker 504 up to the left ear. The user then decides to switch to a video call and holds the device in the right hand, although not necessary the user rotates the device through 180 degrees normal to the touchscreen so the grip position is more appropriate. The software displayed on the screen rotates through 180 degrees based on the orientation detected from the accelerometer in the device. The upper camera 506 is activated to capture the image for the video call and both earpiece speakers 504 are activated to provide the volume necessary for a speakerphone mode. The upper proximity sensor can verify the device is not up against the user's head and therefore allows the earpiece speakers 504 to exceed the volume that is used when the device is held to a user's head.

Figure 34:
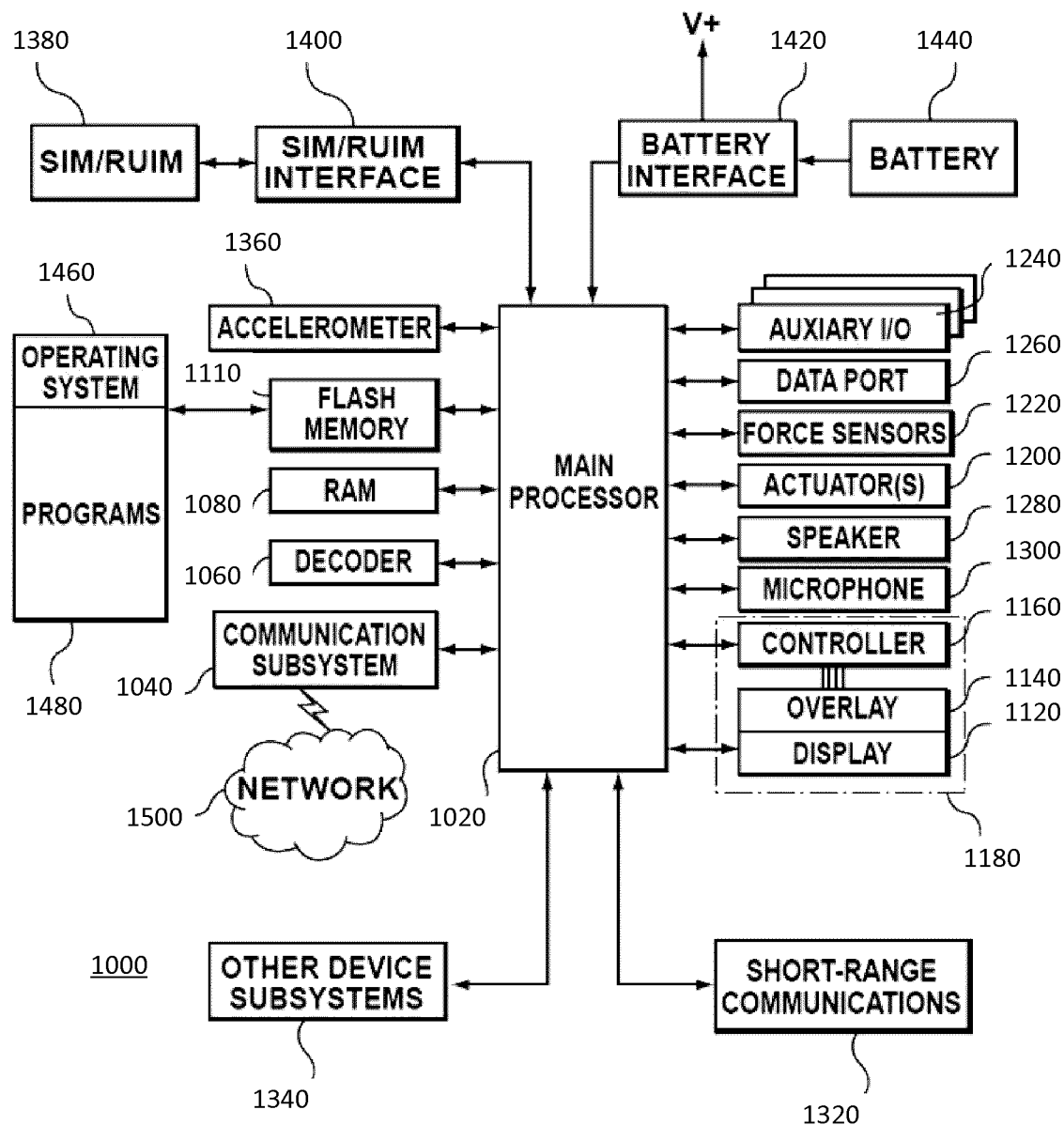
FIG. 34 is a simplified block diagram of components of a mobile device.

FIG. 34 shows a simplified block diagram of components of a mobile device or portable electronic device 1000. The portable electronic device 1000 includes multiple components such as a processor 1020 that controls the operations of the portable electronic device 1000. Communication functions, including data communications, voice communications, or both may be performed through a communication subsystem 1040. Data received by the portable electronic device 1000 may be decompressed and decrypted by a decoder 1060. The communication subsystem 1040 may receive messages from and send messages to a wireless network 1500.

The wireless network 1500 may be any type of wireless network, including, but not limited to, data-centric wireless networks, voice-centric wireless networks, and dual-mode networks that support both voice and data communications.

The portable electronic device 1000 may be a battery-powered device and as shown includes a battery interface 1420 for receiving one or more rechargeable batteries 1440.

The processor 1020 also interacts with additional subsystems such as a Random Access Memory (RAM) 1080, a flash memory 1100, a display 1120 (e.g. with a touch-sensitive overlay 1140 connected to an electronic controller 1160 that together comprise a touch-sensitive display 1180), an actuator assembly 1200, one or more optional force sensors 1220, an auxiliary input/output (I/O) subsystem 1240, a data port 1260, a speaker 1280, a microphone 1300, short-range communications systems 1320 and other device subsystems 1340.

In some embodiments, user-interaction with the graphical user interface may be performed through the touch-sensitive overlay 1140. The processor 1020 may interact with the touch-sensitive overlay 1140 via the electronic controller 1160. Information, such as text, characters, symbols, images, icons, and other items that may be displayed or rendered on a portable electronic device generated by the processor 102 may be displayed on the touch-sensitive display 118.

The processor 1020 may also interact with an accelerometer 1360 as shown in FIG. 34. The accelerometer 1360 may be utilized for detecting direction of gravitational forces or gravity-induced reaction forces.

To identify a subscriber for network access according to the present embodiment, the portable electronic device 1000 may use a Subscriber Identity Module or a Removable User Identity Module (SIM/RUIM) card 1380 inserted into a SIM/RUIM interface 1400 for communication with a network (such as the wireless network 1500). Alternatively, user identification information may be programmed into the flash memory 1100 or performed using other techniques.

The portable electronic device 1000 also includes an operating system 1460 and software components 1480 that are executed by the processor 1020 and which may be stored in a persistent data storage device such as the flash memory 1100. Additional applications may be loaded onto the portable electronic device 1000 through the wireless network 1500, the auxiliary I/O subsystem 1240, the data port 1260, the short-range communications subsystem 1320, or any other suitable device subsystem 1340.

In use, a received signal such as a text message, an e-mail message, web page download, or other data may be processed by the communication subsystem 1040 and input to the processor 1020. The processor 1020 then processes the received signal for output to the display 1120 or alternatively to the auxiliary I/O subsystem 1240. A subscriber may also compose data items, such as e-mail messages, for example, which may be transmitted over the wireless network 1500 through the communication subsystem 1040.

For voice communications, the overall operation of the portable electronic device 1000 may be similar. The speaker 1280 may output audible information converted from electrical signals, and the microphone 1300 may convert audible information into electrical signals for processing.

What has been described and illustrated herein is a preferred embodiment of the disclosure along with some of its variations. The terms, descriptions and figures used herein are set forth by way of illustration only and are not meant as limitations. Those skilled in the art will recognize that many variations are possible within the spirit and scope of the disclosure in which all terms are meant in their broadest, reasonable sense unless otherwise indicated. Any headings utilized within the description are for convenience only and have no legal or limiting effect.

While the above description provides examples of one or more apparatus, methods, or systems, it will be appreciated that other apparatus, methods, or systems may be within the scope of the claims as interpreted by one of skill in the art.

The invention claimed is:

1. A mobile device comprising:
    a first body portion containing operational components of the mobile device, wherein the first body portion has a display surface and a rear surface opposite the display surface, wherein the rear surface has a cavity;
    a second body portion coupled to the first body portion on the rear surface, containing auxiliary operational components of the mobile device; and
    a coupling hinge coupling the first body portion to the second body portion and for providing movement of the second body portion from a first position to a second position;
    wherein, in the first position, the second body portion is recessed within the cavity of the first body portion;
    wherein, in the second position, the second body portion is positioned on the rear surface of the first body portion and the cavity is at least partially open to form a grip area on the rear surface of the first body portion, and
    wherein the second body portion has a second thickness and the cavity has a cavity depth, and the grip area has a grip area depth when the second body portion is in the second position that is equal to at least the second thickness combined with the cavity depth.

2. The mobile device of claim 1, wherein when the mobile device is in the second position, a keyboard on the display of the mobile device is in a one handed configuration.

3. The mobile device of claim 1, wherein, in the first position, the mobile device has a first thickness and, in the second position, the mobile device is thicker than the first thickness in the grip area and thinner than the first thickness in the area of the cavity.

4. The mobile device of claim 3 wherein the grip area has a thickness of at least the first thickness and the second thickness.

5. The mobile device of claim 1, wherein the coupling hinge is a double hinge mechanism for providing rotational coupling of the second body portion relative to the first body portion.

6. The mobile device of claim 1, wherein the coupling hinge is a four bar linkage for providing translational coupling of the second body portion relative to the first body portion.

7. The mobile device of claim 1, wherein the coupling hinge is a simple hinge for providing rotational coupling of the second body portion relative to the first body portion.

8. The mobile device of claim 1, wherein, in the first position, the second body portion extends to an edge of the mobile device.

9. The mobile device of claim 1, wherein the first body portion includes a relief to allow a user's fingers to engage the second body portion.

10. The mobile device of claim 1, wherein the auxiliary operational components include a battery.

11. The mobile device of claim 10, wherein the second body portion is removable from the first body portion such that the battery can be removed from the second body portion.

12. The mobile device of claim 1 further comprising a retention system for holding the position of the second body portion relative to the first body portion.

13. The mobile device of claim 12, wherein the retention system includes a single magnet or multiple magnets on the second body portion and a complimentary magnet or ferromagnetic components of the first body portion.

14. The mobile device of claim 12, wherein the retention system includes a spring and cam system in the coupling hinge for providing a force to maintain the position of the second body portion relative to the first body portion.

15. The mobile device of claim 12, wherein the retention system holds the second body portion in the first and second positions.

* * * * *